United States Patent
Hu et al.

(10) Patent No.: US 12,256,371 B2
(45) Date of Patent: Mar. 18, 2025

(54) DISTRIBUTED RESOURCE UNIT TONE PLAN OPTIMIZATION FOR PAPR REDUCTION

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 251 days.

(21) Appl. No.: 17/862,714

(22) Filed: Jul. 12, 2022

(65) Prior Publication Data

US 2023/0025632 A1 Jan. 26, 2023

Related U.S. Application Data

(60) Provisional application No. 63/227,380, filed on Jul. 30, 2021, provisional application No. 63/223,083, filed on Jul. 19, 2021.

(51) Int. Cl.
   *H04W 72/0453* (2023.01)
(52) U.S. Cl.
   CPC .............. *H04W 72/0453* (2013.01)
(58) Field of Classification Search
   CPC ........ H04W 72/0453; H04L 27/2614
   See application file for complete search history.

(56) References Cited

U.S. PATENT DOCUMENTS

| 2020/0014509 | A1 | 1/2020 | Asterjadhi et al. |
| 2021/0143955 | A1 | 5/2021 | Yang et al. |
| 2021/0392661 | A1* | 12/2021 | Cao .................. H04W 72/0453 |

(Continued)

FOREIGN PATENT DOCUMENTS

EP 2293507 A2 3/2011

OTHER PUBLICATIONS

European Patent Office, Extended European Search Report for European Patent Application No. 22184989.6, Dec. 20, 2022.

(Continued)

*Primary Examiner* — Deepa Belur
(74) *Attorney, Agent, or Firm* — Andy M. Han; Han IP PLLC

(57) ABSTRACT

Various schemes pertaining to optimization of distributed resource unit (RU) tone plans for peak-to-average power ratio (PAPR) reduction in 6 GHz low-power indoor (LPI) systems are described. An apparatus distributes a plurality of subcarriers of a RU over a bandwidth to generate a distributed-tone RU (dRU) or a distributed-tone multi-RU (dMRU). The apparatus then communicates with a communication entity using the dRU or the dMRU. In distributing the plurality of subcarriers of the RU to generate the dRU or the dMRU, the apparatus distributes the plurality of subcarriers of the RU with a predefined span over each 20 MHz frequency segment or subblock in the bandwidth and with a gap of at least a minimum size around a center direct-current (DC) tone in a distribution pattern of the plurality of subcarriers to result in reduction in a PAPR in communicating with the communication entity.

20 Claims, 37 Drawing Sheets

(56) References Cited

U.S. PATENT DOCUMENTS

| | | | |
|---|---|---|---|
| 2022/0141052 A1* | 5/2022 | Montreuil | H04W 72/044 |
| | | | 370/329 |
| 2022/0369315 A1* | 11/2022 | Yang | H04L 27/26132 |
| 2023/0048884 A1* | 2/2023 | Yang | H04L 5/0041 |
| 2023/0069075 A1* | 3/2023 | Yang | H04W 52/18 |
| 2024/0106615 A1* | 3/2024 | Hu | H04L 5/0046 |
| 2024/0113842 A1* | 4/2024 | Hu | H04L 5/0064 |

OTHER PUBLICATIONS

"27. High-efficiency (HE) PHY specification (11ax) 27.1 Introduction 27.1.1 Introduction to the HE PHY", IEEE Draft; REVME_CL_27.FM, IEEE-SA, Piscataway, NJ USA, No. D0.1 Jun. 29, 2021, pp. 1-297, XP068183275.

Taiwan Intellectual Property Office, Office Action for Taiwan Patent Application No. 111126457, Jan. 12, 2023.

Edward Au, "Specification Framework for TGbe", IEEE P802.11 Wireless LANs, Sep. 5, 2020, https://mentor.ieee.org/802.11/dcn/19/11-19-1262-14-00be-specification-framework-for-tgbe.docx, pp. 9-11, Figures 2-4.

* cited by examiner

- BW20, Np=9

| RU size | RUstart | {li} |
|---|---|---|
| 26 | {0 4 2 6 8 1 5 3 7} | {0} |
| 52 | {0 2 1 3} | {0,4} |
| 106 | {0 1} | {0,2,4,6} |

FIG. 2C

Data and pilot subcarrier indices for distributed RUs (dRUs) in a 20MHz EHT TB PPDU for 6GHz LPI

| dRU type | dRU index and subcarrier range | | | | |
|---|---|---|---|---|---|
| | dRU1 | dRU2 | dRU3 | dRU4 | dRU5 |
| 26-tone dRU i=1:9 | [-120:9:-12, 6:9:114] | [-116:9:-8, 10:9:118] | [-118:9:-10, 8:9:116] | [-114:9:-6, 12:9:120] | [-112:9:-4, 5:9:113] |
| | dRU6 | dRU7 | dRU8 | dRU9 | |
| | [-119:9:-11, 7:9:115] | [-115:9:-7, 11:9:119] | [-117:9:-9, 9:9:117] | [-113:9:-5, 4:9:112] | |
| 52-tone dRU i=1:4 | dRU1<br>26-tone [dRU1, dRU2] | | dRU2<br>26-tone [dRU3, dRU4] | | |
| | dRU3<br>26-tone [dRU6, dRU7] | | dRU4<br>26-tone [dRU8, dRU9] | | |
| 106-tone dRU i=1:2 | dRU1<br>26-tone [dRU1~4], [-3, 3] | | dRU2<br>26-tone [dRU6~9], [-2, 2] | | |

FIG. 7A

Data and pilot subcarrier indices for distributed RUs (dRUs) in a 20MHz EHT TB PPDU for 6GHz LPI

| dRU type | dRU index and subcarrier range | | | | |
|---|---|---|---|---|---|
| 26-tone dRU i=1:9 | dRU1 [-118:9:-10, 8:9:116] | dRU2 [-114:9:-6, 3:9:111] | dRU3 [-116:9:-8, 10:9:118] | dRU4 [-112:9:-4, 5:9:113] | dRU5 [-110:9:-2, 7:9:115] |
| | dRU6 [-117:9:-9, 9:9:117] | dRU7 [-113:9:-5, 4:9:112] | dRU8 [-115:9:-7, 11:9:119] | dRU9 [-111:9:-3, 6:9:114] | |
| 52-tone dRU i=1:4 | dRU1 26-tone [dRU1, dRU2] | | dRU2 26-tone [dRU3, dRU4] | | |
| | dRU3 26-tone [dRU6, dRU7] | | dRU4 26-tone [dRU8, dRU9] | | |
| 106-tone dRU i=1:2 | dRU1 26-tone [dRU1~4], [-120, 120] | | dRU2 26-tone [dRU6~9], [-119, 2] | | |

FIG. 7B

Data and pilot subcarrier indices for distributed RUs (dRUs) in a 20MHz EHT TB PPDU for 6GHz LPI

| dRU type | dRU index and subcarrier range | | | | |
|---|---|---|---|---|---|
| | dRU1 | dRU2 | dRU3 | dRU4 | dRU5 |
| 26-tone dRU i=1:9 | [-121:9:-13, 5:9:113] | [-117:9:-9, 9:9:117] | [-119:9:-11, 7:9:115] | [-115:9:-7, 11:9:119] | [-113:9:-5, 13:9:121] |
| | dRU6 | dRU7 | dRU8 | dRU9 | |
| | [-120:9:-12, 6:9:114] | [-116:9:-8, 10:9:118] | [-118:9:-10, 8:9:116] | [-114:9:-6, 12:9:120] | |
| 52-tone dRU i=1:4 | dRU1 26-tone [dRU1, dRU2] | | dRU2 26-tone [dRU3, dRU4] | | |
| | dRU3 26-tone [dRU6, dRU7] | | dRU4 26-tone [dRU8, dRU9] | | |
| 106-tone dRU i=1:2 | dRU1 26-tone [dRU1~4], [-4, 3] | | dRU2 26-tone [dRU6~9], [-3, 4] | | |

| RU size | RUstart | {li} |
|---|---|---|
| 26 | {0 9 4 12 16 2 10 6 14 1 9 5 13 17 3 11 7 15} | {0} |
| 52 | {0 4 2 6 1 5 3 7} | {0, 8} |
| 106 | {0 2 1 3} | {0, 4, 8, 12} |
| 242 | {0, 0} | 0:2:16 |

FIG. 9B

Data and pilot subcarrier indices for distributed RUs (dRUs) in a 40MHz EHT TB PPDU for 6GHz LPI

| dRU type | dRU index and subcarrier range | | | | | |
|---|---|---|---|---|---|---|
| | dRU1 | dRU2 | dRU3 | dRU4 | dRU5 | dRU6 |
| 26-tone dRU i=1:18 | [-242:18:-26, 10:18:226] | [-234:18:-18, 18:18:234] | [-238:18:-22, 14:18:230] | [-230:18:-14, 22:18:238] | [-226:18:-10, 26:18:242] | [-240:18:-24, 12:18:228] |
| | dRU7 | dRU8 | dRU9 | dRU10 | dRU11 | dRU12 |
| | [-232:18:-16, 20:18:236] | [-236:18:-20, 16:18:232] | [-228:18:-12, 24:18:240] | [-241:18:-25, 11:18:227] | [-233:18:-17, 19:18:235] | [-237:18:-21, 15:18:231] |
| | dRU13 | dRU14 | dRU15 | dRU16 | dRU17 | dRU18 |
| | [-229:18:-13, 23:18:239] | [-225:18:-9, 27:18:243] | [-239:18:-23, 13:18:229] | [-231:18:-15, 21:18:237] | [-235:18:-19, 17:18:233] | [-227:18:-11, 25:18:241] |
| 52-tone dRU i=1:8 | dRU1 26-tone [dRU1,dRU2] | dRU4 26-tone [dRU8,dRU9] | dRU2 26-tone [dRU3,dRU4] | dRU5 26-tone [dRU10,dRU11] | dRU3 26-tone [dRU6,dRU7] | dRU6 26-tone [dRU12,dRU13] |
| | dRU7 26-tone [dRU15,dRU16] | | dRU8 26-tone [dRU17,dRU18] | | | |
| 106-tone dRU i=1:4 | dRU1 26-tone [dRU1~4], [-8,4] | dRU4 26-tone [dRU15~18], [-5,7] | dRU2 26-tone [dRU6~9], [-6,6] | | dRU3 26-tone [dRU10~13], [-7,5] | |
| 242-tone dRU i=1:2 | dRU1 [-244:2:-4, 4:2:244] | | dRU2 [-243:2:-3, 3:2:243] | | | |

Data and pilot subcarrier indices for distributed RUs (dRUs) in a 40MHz EHT TB PPDU for 6GHz LPI

1300

| dRU type | dRU index and subcarrier range | | | | | |
|---|---|---|---|---|---|---|
| 26-tone dRU i=1:18 | dRU1 [-242:9:-17, 10:9:235] [-242:18:-26, 10:18:226] | dRU2 [-233:18:-17, 19:18:235] | dRU3 [-238:18:-22, 14:18:230] | dRU4 [-229:18:-13, 23:18:239] | dRU5 [-225:18:-9, 27:18:243] | dRU6 [-240:18:-24, 12:18:228] |
| | dRU7 [-231:18:-15, 21:18:237] | dRU8 [-236:18:-20, 16:18:232] | dRU9 [-227:18:-11, 25:18:241] | dRU10 [-241:18:-25, 11:18:227] | dRU11 [-232:18:-16, 20:18:236] | dRU12 [-237:18:-21, 15:18:231] |
| | dRU13 [-228:18:-12, 24:18:240] | dRU14 [-234:18:-18, 18:18:234] | dRU15 [-239:18:-23, 13:18:229] | dRU16 [-230:18:-14, 22:18:238] | dRU17 [-235:18:-19, 17:18:233] | dRU18 [-226:18:-10, 26:18:242] |
| 52-tone dRU i=1:8 | dRU1 [-242:9:-17, 10:9:235] | dRU2 [-238:9:-13, 14:9:239] | | | dRU3 [-240:9:-15, 12:9:237] | |
| | dRU4 [-236:9:-11, 16:9:241] | dRU5 [-241:9:-16, 11:9:236] | | | dRU6 [-237:9:-12, 15:9:240] | |
| | dRU7 [-239:9:-14, 13:9:238] | dRU8 [-235:9:-10, 17:9:242] | | | | |
| 106-tone dRU i=1:4 | dRU1 26-tone [dRU1~4], [-8,5] | dRU2 26-tone [dRU6~9], [-6,7] | | | dRU3 26-tone [dRU10~13], [-7,6] | |
| | dRU4 26-tone [dRU15~18], [-5,8] | | | | | |
| 242-tone dRU i=1:2 | dRU1 106-tone [dRU1~2],26-tone dRU5, [-244,-4,3,9] | dRU2 106-tone [dRU3~4],26-tone dRU14, [-243,-3,4,244] | | | | |

- BW80, Np=36

| RU size | RUstart | {li} |
|---|---|---|
| 26 | {V,V+1} | {0} |
| 52 | {0,8,4,12,6,14,2,10,1,9,5,13,7,15,3,11} | {0,16} |
| 106 | {0,4,6,2,1,5,7,3} | {0,8,16,24} |
| 242 | {0,2,1,3} | {0:4:32} |
| 484 | {0,1} | {0:2:34} |

Data and pilot subcarrier indices for distributed RUs (dRUs) in a 80MHz EHT TB PPDU for 6GHz LPI

| dRU type | | |
|---|---|---|
| 26-tone dRU i=1:37 | dRU1 [-483:36:-51, 17:36:449] | dRU2 [-467:36:-35, 33:36:465] |
| | dRU7 [-463:36:-31, 37:36:469] | dRU8 [-471:36:-39, 29:36:461] |
| | dRU13 [-453:36:-21, 47:36:479] | dRU14 [-449:36:-17, 51:36:483] |
| | dRU19 [not defined] | dRU20 [-482:36:-50, 18:36:450] |
| | dRU25 [-478:36:-46, 22:36:454] | dRU26 [-462:36:-30, 38:36:470] |
| | dRU31 [-468:36:-36, 32:36:464] | dRU32 [-452:36:-20, 48:36:480] |
| | dRU37 [-456:36:-24, 44:36:476] | |
| 52-tone dRU i=1:16 | dRU1 26-tone [dRU1, dRU2] | dRU2 26-tone [dRU3, dRU4] |
| | dRU7 26-tone [dRU15, dRU16] | dRU8 26-tone [dRU17, dRU18] |
| | dRU13 26-tone [dRU29, dRU30] | dRU14 26-tone [dRU31, dRU32] |
| 106-tone dRU i=1:8 | dRU1 26-tone [dRU1~4], [-495, 485] | dRU2 26-tone [dRU6~9],[-491, 489] |
| | dRU7 26-tone [dRU29~32],[-488,492] | dRU8 26-tone [dRU34~37],[-492,488] |
| 242-tone dRU i=1:4 | dRU1 [-499:4:-19, 17:4:497] | |
| | dRU4 [-496:4:-16, 20:4:500] | |
| 484-tone dRU i=1:2 | dRU1 [-499:2:-17, 17:2:499] | |

Data and pilot subcarrier indices for distributed RUs (dRUs) in a 80MHz EHT TB PPDU for 6GHz LPI

| dRU type | dRU index and subcarrier range | |
|---|---|---|
| 26-tone dRU i=1:37 | dRU3 [-475:36:-43, 25:36:457] | dRU4 [-459:36:-27, 41:36:473] |
| | dRU9 [-455:36:-23, 45:36:477] | dRU10 [-477:36:-45, 23:36:455] |
| | dRU15 [-481:36:-49, 19:36:451] | dRU16 [-465:36:-33, 35:36:467] |
| | dRU21 [-466:36:-34, 34:36:466] | dRU22 [-474:36:-42, 26:36:458] |
| | dRU27 [-470:36:-38, 30:36:462] | dRU28 [-454:36:-22, 46:36:478] |
| | dRU33 [-448:36:-16, 52:36:484] | dRU34 [-480:36:-48, 20:36:452] |
| 52-tone dRU i=1:16 | dRU3 26-tone [dRU6, dRU7] | dRU4 26-tone [dRU8, dRU9] |
| | dRU9 26-tone [dRU20, dRU21] | dRU10 26-tone [dRU22, dRU23] |
| | dRU15 26-tone [dRU34, dRU35] | dRU16 26-tone [dRU36, dRU37] |
| 106-tone dRU i=1:8 | dRU3 26-tone [dRU10~13],[-489, 491] | dRU4 26-tone [dRU15~18],[-493, 487] |
| 242-tone dRU i=1:4 | dRU2 [-497:4:-17, 19:4:499] | |
| 484-tone dRU i=1:2 | dRU2 [-498:2:-16, 18:2:500] | |

Data and pilot subcarrier indices for distributed RUs (dRUs) in a 80MHz EHT TB PPDU for 6GHz LPI

| dRU type | | |
|---|---|---|
| 26-tone dRU i=1:37 | dRU5 [-451:36:-19, 49:36:481] | dRU6 [-479:36:-47, 21:36:453] |
| | dRU11 [-461:36:-29, 39:36:471] | dRU12 [-469:36:-37, 31:36:463] |
| | dRU17 [-473:36:-41, 27:36:459] | dRU18 [-457:36:-25, 43:36:475] |
| | dRU23 [-458:36:-26, 42:36:474] | dRU24 [-450:36:-18, 50:36:482] |
| | dRU29 [-476:36:-44, 24:36:456] | dRU30 [-460:36:-28, 40:36:472] |
| | dRU35 [-464:36:-32, 36:36:468] | dRU36 [-472:36:-40, 28:36:460] |
| 52-tone dRU i=1:16 | dRU5 26-tone [dRU10, dRU11] | dRU6 26-tone [dRU12, dRU3] |
| | dRU11 26-tone [dRU25, dRU26] | dRU12 26-tone [dRU27, dRU28] |
| 106-tone dRU i=1:8 | dRU5 26-tone [dRU20~23],[-494, 486] | dRU6 26-tone [dRU25~28],[-490,490] |
| 242-tone dRU i=1:4 | dRU3 [-498:4:-18, 18:4:498] | |
| 484-tone dRU i=1:2 | | |

| | | | | |
|---|---|---|---|---|
| 52-tone dRU i=1:16 | dRU1 [-483:36:-51, 17:36:-35, 33:36:465] | dRU2 [-475:36:-43, 25:36:-27, 41:36:473] | dRU3 [-479:36:-47, 21:36:-31, 37:36:469] | dRU4 [-471:36:-39, 29:36:-23, 45:36:477] |
| | dRU5 [-477:36:-45, 23:36:-29, 39:36:471] | dRU6 [-469:36:-37, 31:36:-21, 47:36:479] | dRU7 [-481:36:-49, 19:36:-33, 35:36:467] | dRU8 [-473:36:-41, 27:36:-25, 43:36:475] |
| | dRU9 [-482:36:-50, 18:36:-34, 34:36:466] | dRU10 [-474:36:-42, 26:36:-26, 42:36:474] | dRU11 [-478:36:-46, 22:36:-30, 38:36:470] | dRU12 [-470:36:-38, 30:36:-22, 46:36:478] |
| | dRU13 [-476:36:-44, 24:36:-28, 40:36:472] | dRU14 [-468:36:-36, 32:36:-20, 48:36:480] | dRU15 [-480:36:-48, 20:36:-32, 36:36:468] | dRU16 [-472:36:-40, 28:36:-24, 44:36:476] |
| 106-tone dRU i=1:8 | dRU1 52-tone [dRU1~2], [-495, 485] | dRU2 52-tone [dRU3~4], [-491, 489] | dRU3 52-tone [dRU5~6], [-489, 491] | dRU4 52-tone [dRU7~8], [-493, 487] |
| | dRU5 52-tone [dRU9~10],[-494, 486] | dRU6 52-tone [dRU11~12],[-490, 490] | dRU7 52-tone [dRU13~14],[-488, 492] | dRU8 52-tone [dRU15~16],[-492, 488] |
| 242-tone dRU i=1:4 | dRU1 [-499:4:-19, 17:4:497] | | dRU2 [-497:4:-17, 19:4:499] | |
| | dRU3 [-498:4:-18, 18:4:498] | | dRU4 [-496:4:-16, 20:4:500] | |
| 484-tone dRU i=1:2 | dRU1 [-499:2:-17, 17:2:499] | | dRU2 [-498:2:-16, 18:2:500] | |

| dRU size | RUstart (r) | {I(l)} |
|---|---|---|
| 26 | {V,V+1} | {0} |
| 52 | {0,8,4,12,2,10,6,14,1,9,5,13,3,11,7,15} | {0} |
| 106 | {0,4,2,6,1,5,3,7} | {0,18} |
| 242 | {0,2,1,3} | {0,8,18,26}<br>[0:4:16, 18:4:30] for dRU1,3<br>[0:4:16, 22:4:34] for dRU2,4 |
| 484 | {0,1} | {0:2:34} |

| dRU size | RUstart (r) | {I(l)} |
|---|---|---|
| 26 | {V,V+1} | {0} |
| 52 | {0,8,4,12,2,10,6,14,1,9,5,13,3,11,7,15}+2 | {0,18} |
| 106 | {0,4,2,6,1,5,3,7}+2 | {0,8,18,26} |
| 242 | {2,0,3,1} | [0:4:16, 18:4:30] for dRU1,3 |
|  |  | [0:4:12, 18:4:30,32] for dRU2,4 |
| 484 | {0,1} | {0:2:34} |

Data and pilot subcarrier indices for distributed RUs (dRUs) in a 80MHz EHT TB PPDU for 6GHz LPI

| dRU type | | |
|---|---|---|
| 26-tone dRU i=1:37 | dRU1 [-474:36:-42, 12:36:444] | dRU2 [-456:36:-24, 30:36:462] |
| | dRU7 [-452:36:-20, 34:36:466] | dRU8 [-462:36:-30, 24:36:456] |
| | dRU13 [-446:36:-14, 40:36:472] | dRU14 [-476:36:-44, 10:36:442] |
| | dRU19 [not defined] | dRU20 [-473:36:-41, 13:36:445] |
| | dRU25 [-469:36:-37, 17:36:449] | dRU26 [-451:36:-19, 35:36:467] |
| | dRU31 [-463:36:-31, 23:36:455] | dRU32 [-445:36:-13, 41:36:473] |
| | dRU37 [-441:36:-9, 45:36:477] | |
| 52-tone dRU i=1:16 | dRU1 [-474:18:-24, 12:18:462] | dRU2 [-466:18:-16, 20:18:470] |
| | dRU7 [-468:18:-18, 18:18:468] | dRU8 [-460:18:-10, 26:18:476] |
| | dRU13 [-471:18:-21, 15:18:465] | dRU14 [-463:18:-13, 23:18:473] |
| | dRU1 52-tone [dRU1~2], [-484, 480] | dRU2 52-tone [dRU3~4], [-480, 484] |
| | dRU7 52-tone [dRU13~14],[-481,483] | dRU8 52-tone [dRU15~16],[-477,487] |
| 106-tone dRU i=1:8 | dRU1 106-tone [dRU1~2], [-492,-488,488,492], 26-tone dRU5 | |
| 242-tone dRU i=1:4 | dRU3 106-tone [dRU5~6], [-491,-487,489,493], 26-tone dRU24 | |
| 484-tone dRU i=1:2 | dRU1 [-492:2:-10,10:2:492] | |

FIG. 20A

Data and pilot subcarrier indices for distributed RUs (dRUs) in a 80MHz EHT TB PPDU for 6GHz LPI

| dRU type | dRU index and subcarrier range | |
|---|---|---|
| 26-tone dRU i=1:37 | dRU3 [-466:36:-34, 20:36:452] | dRU4 [-448:36:-16, 38:36:470] |
| | dRU9 [-444:36:-12, 42:36:474] | dRU10 [-472:36:-40, 14:36:446] |
| | dRU15 [-468:36:-36, 18:36:450] | dRU16 [-450:36:-18, 36:36:468] |
| | dRU21 [-455:36:-23, 31:36:463] | dRU22 [-465:36:-33, 21:36:453] |
| | dRU27 [-461:36:-29, 25:36:457] | dRU28 [-443:36:-11, 43:36:475] |
| | dRU33 [-475:36:-43, 11:36:443] | dRU34 [-467:36:-35, 19:36:451] |
| 52-tone dRU i=1:16 | dRU3 [-470:18:-20, 16:18:466] | dRU4 [-462:18:-12, 24:18:474] |
| | dRU9 [-473:18:-23, 13:18:463] | dRU10 [-465:18:-15, 21:18:471] |
| | dRU15 [-467:18:-17, 19:18:469] | dRU16 [-459:18:-9, 27:18:477] |
| 106-tone dRU i=1:8 | dRU3 52-tone [dRU5~6],[-482, 482] | dRU4 52-tone [dRU7~8],[-478, 486] |
| 242-tone dRU i=1:4 | dRU2 106-tone [dRU3~4], [-490,-486,478,490], 26-tone dRU14 | |
| | dRU4 106-tone [dRU7~8], [-489,-485,479,491], 26-tone dRU33 | |
| 484-tone dRU i=1:2 | dRU2 [-491:2:-9, 11:2:493] | |

Data and pilot subcarrier indices for distributed RUs (dRUs) in a 80MHz EHT TB PPDU for 6GHz LPI

| dRU type | | |
|---|---|---|
| 26-tone dRU i=1:37 | dRU5 [-458:36:-26, 28:36:460] | dRU6 [-470:36:-38, 16:36:448] |
| | dRU11 [-454:36:-22, 32:36:464] | dRU12 [-464:36:-32, 22:36:454] |
| | dRU17 [-460:36:-28, 26:36:458] | dRU18 [-442:36:-10, 44:36:476] |
| | dRU23 [-447:36:-15, 39:36:471] | dRU24 [-457:36:-25, 29:36:461] |
| | dRU29 [-471:36:-39, 15:36:447] | dRU30 [-453:36:-21, 33:36:465] |
| | dRU35 [-449:36:-17, 37:36:469] | dRU36 [-459:36:-27, 27:36:459] |
| 52-tone dRU i=1:16 | dRU5 [-472:18:-22, 14:18:464] | dRU6 [-464:18:-14, 22:18:472] |
| | dRU11 [-469:18:-19, 17:18:467] | dRU12 [-461:18:-11, 25:18:475] |
| 106-tone dRU i=1:8 | dRU5 52-tone [dRU9~10],[-483, 481] | dRU6 52-tone [dRU11~12],[-479, 485] |
| 242-tone dRU i=1:4 | | |
| 484-tone dRU i=1:2 | | |

FIG. 20C

| | | | | |
|---|---|---|---|---|
| 52-tone dRU i=1:16 | dRU1 [-474:18:-24, 12:18:462] | dRU2 [-466:18:-16, 20:18:470] | dRU3 [-470:18:-20, 16:18:466] | dRU4 [-462:18:-12, 24:18:474] |
| | dRU5 [-472:18:-22, 14:18:464] | dRU6 [-464:18:-14, 22:18:472] | dRU7 [-468:18:-18, 18:18:468] | dRU8 [-460:18:-10, 26:18:476] |
| | dRU9 [-473:18:-23, 13:18:463] | dRU10 [-465:18:-15, 21:18:471] | dRU11 [-469:18:-19, 17:18:467] | dRU12 [-461:18:-11, 25:18:475] |
| | dRU13 [-471:18:-21, 15:18:465] | dRU14 [-463:18:-13, 23:18:473] | dRU15 [-467:18:-17, 19:18:469] | dRU16 [-459:18:-9, 27:18:477] |
| 106-tone dRU i=1:8 | dRU1 52-tone [dRU1~2], [-484, 480] | dRU2 52-tone [dRU3~4], [-480, 484] | dRU3 52-tone [dRU5~6], [-482, 482] | dRU4 52-tone [dRU7~8], [-478, 486] |
| | dRU5 52-tone [dRU9~10], [-483, 481] | dRU6 52-tone [dRU11~12], [-479, 485] | dRU7 52-tone [dRU13~14], [-481, 483] | dRU8 52-tone [dRU15~16], [-477, 487] |
| 242-tone dRU i=1:4 | dRU1 106-tone [dRU1~2], [-492,-488,488,492], [-458:36:-26, 28:36:460] | | dRU2 106-tone [dRU3~4], [-490,-486,478,490], [-476:36:-44, 10:36:442] | |
| | dRU3 106-tone [dRU5~6], [-491,-487,489,493], [-457:36:-25, 29:36:461] | | dRU4 106-tone [dRU7~8], [-489,-485,479,491], [-475:36:-43, 11:36:443] | |
| 484-tone dRU i=1:2 | dRU1 [-492:2:-10, 10:2:492] | | dRU2 [-491:2:-9, 11:2:493] | |

Data and pilot subcarrier indices for distributed RUs (dRUs) in a 20MHz EHT TB PPDU for 6GHz LPI

| dRU type | dRU index and subcarrier range | | | | | | | | |
|---|---|---|---|---|---|---|---|---|---|
| 26-tone dRU $i = 1:9$ | dRU1 [-121:9:-13, 5:9:113] | dRU2 [-117:9:-9, 9:9:117] | dRU3 [-119:9:-11, 7:9:115] | dRU4 [-115:9:-7, 11:9:119] | dRU5 [-113:9:-5, 13:9:121] | | | | |
| | dRU6 [-120:9:-12, 6:9:114] | dRU7 [-116:9:-8, 10:9:118] | dRU8 [-118:9:-10, 8:9:116] | dRU9 [-114:9:-6, 12:9:120] | | | | | |
| 52-tone dRU $i = 1:4$ | dRU1 26-tone [dRU1, dRU2] | | dRU2 26-tone [dRU3, dRU4] | | | | | | |
| | dRU3 26-tone [dRU6, dRU7] | | dRU4 26-tone [dRU8, dRU9] | | | | | | |
| 106-tone dRU $i = 1:2$ | dRU1 26-tone [dRU1~dRU4], [-4, 3] | | dRU2 26-tone [dRU6~dRU9], [-3, 4] | | | | | | | dMRU78_1 may be built from 52-tone dRU2 and 26-tone dRU2 dMRU132_2 may be built from 26-tone dRU5 and 106-tone dRU2

DISTRIBUTE A PLURALITY OF SUBCARRIERS OF A RESOURCE UNIT (RU) OVER A BANDWIDTH TO GENERATE A DISTRIBUTED-TONE RU (DRU) OR A DISTRIBUTED-TONE MULTI-RU (DMRU) BY DISTRIBUTING THE PLURALITY OF SUBCARRIERS OF THE RU WITH A PREDEFINED SPAN OVER EACH 20MHz FREQUENCY SEGMENT OR SUBBLOCK IN THE BANDWIDTH AND WITH A GAP OF AT LEAST A MINIMUM SIZE AROUND A CENTER DIRECT-CURRENT (DC) TONE IN A DISTRIBUTION PATTERN OF THE PLURALITY OF SUBCARRIERS TO RESULT IN REDUCTION IN A PEAK-TO-AVERAGE POWER RATIO (PAPR) IN COMMUNICATING WITH THE COMMUNICATION ENTITY

2610

COMMUNICATE WITH A COMMUNICATION ENTITY USING THE DRU OR THE DMRU

DISTRIBUTED RESOURCE UNIT TONE PLAN OPTIMIZATION FOR PAPR REDUCTION

CROSS REFERENCE TO RELATED PATENT APPLICATION

The present disclosure is part of a non-provisional patent application claiming the priority benefit of U.S. Provisional Patent Application Nos. 63/223,083 and 63/227,380, filed 19 Jul. 2021 and 30 Jul. 2021, respectively, the contents of which being incorporated by reference in their entirety.

TECHNICAL FIELD

The present disclosure is generally related to wireless communications and, more particularly, to distributed resource unit tone plan optimization for peak-to-average power ratio (PAPR) reduction.

BACKGROUND

Unless otherwise indicated herein, approaches described in this section are not prior art to the claims listed below and are not admitted as prior art by inclusion in this section.

There are strict power spectral density (PSD) requirements for low-power indoor (LPI) applications in 6 GHz which tend to result in lower power in transmission and short coverage range. One approach to improving coverage range is to distribute tones of regular resource unit (RU) (herein interchangeably referred to as "rRU", "regular RU" and "logical RU") over a wider bandwidth or a large frequency subblock, thereby resulting in interleaved, interlaced or otherwise distributed-tone RUs (dRU) to achieve higher transmission power for 6 GHz low-power indoor (LPI) systems. Unlike regular RUs in which subcarriers are basically continuous or adjacent to one another, the subcarriers in dRUs are spread over a wider bandwidth and hence the tones are separated apart with different distances therebetween. Due to tone separations or non-continuity, in general, distributed-tone RU transmission tends to result in higher PAPR than regular RU. Therefore, there is a need for a solution for optimization of distributed RU tone plans for PAPR reduction in 6 GHz LPI systems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to optimization of distributed RU tone plans for PAPR reduction in 6 GHz LPI systems. It is believed that implementations of the proposed schemes may address or otherwise alleviate aforementioned issues. For instance, implementation of various proposed schemes in accordance with the present disclosure with respect to optimized dRU tone plan may reduce PAPR and achieve optimal power boost gains for dRU of different sizes on each of 20 MHz, 40 MHz and 80 MHz bandwidths.

In one aspect, a method may involve distributing a plurality of subcarriers of a RU over a bandwidth to generate a dRU or a distributed-tone multi-RU (dMRU). The method may also involve communicating with a communication entity using the dRU or the dMRU. In distributing the plurality of subcarriers of the RU to generate the dRU or the dMRU, the method may involve distributing the plurality of subcarriers of the RU with a predefined span over each 20 MHz frequency segment or subblock in the bandwidth and with a gap of at least a minimum size around a center direct-current (DC) tone in a distribution pattern of the plurality of subcarriers to result in reduction in a PAPR in communicating with the communication entity.

In another aspect, an apparatus may include a transceiver and a processor coupled to the transceiver. The transceiver may be configured to transmit and receive wirelessly. The processor may be configured to distribute a plurality of subcarriers of a RU over a bandwidth to generate a dRU or a dMRU. The processor may also be configured to communicate, via the transceiver, with a communication entity using the dRU or the dMRU. In distributing the plurality of subcarriers of the RU to generate the dRU or the dMRU, the processor may be configured to distribute the plurality of subcarriers of the RU with a predefined span over each 20 MHz frequency segment or subblock in the bandwidth and with a gap of at least a minimum size around a center DC tone in a distribution pattern of the plurality of subcarriers to result in reduction in a PAPR in communicating with the communication entity.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

Each of FIG. 2A, FIG. 2B

Each of FIG. 7A and FIG. 7B is a diagram of an example design under a proposed scheme in accordance with the present disclosure.

FIG. 8 is a diagram of an example design under a proposed scheme in accordance with the present disclosure.

Figure 9A:
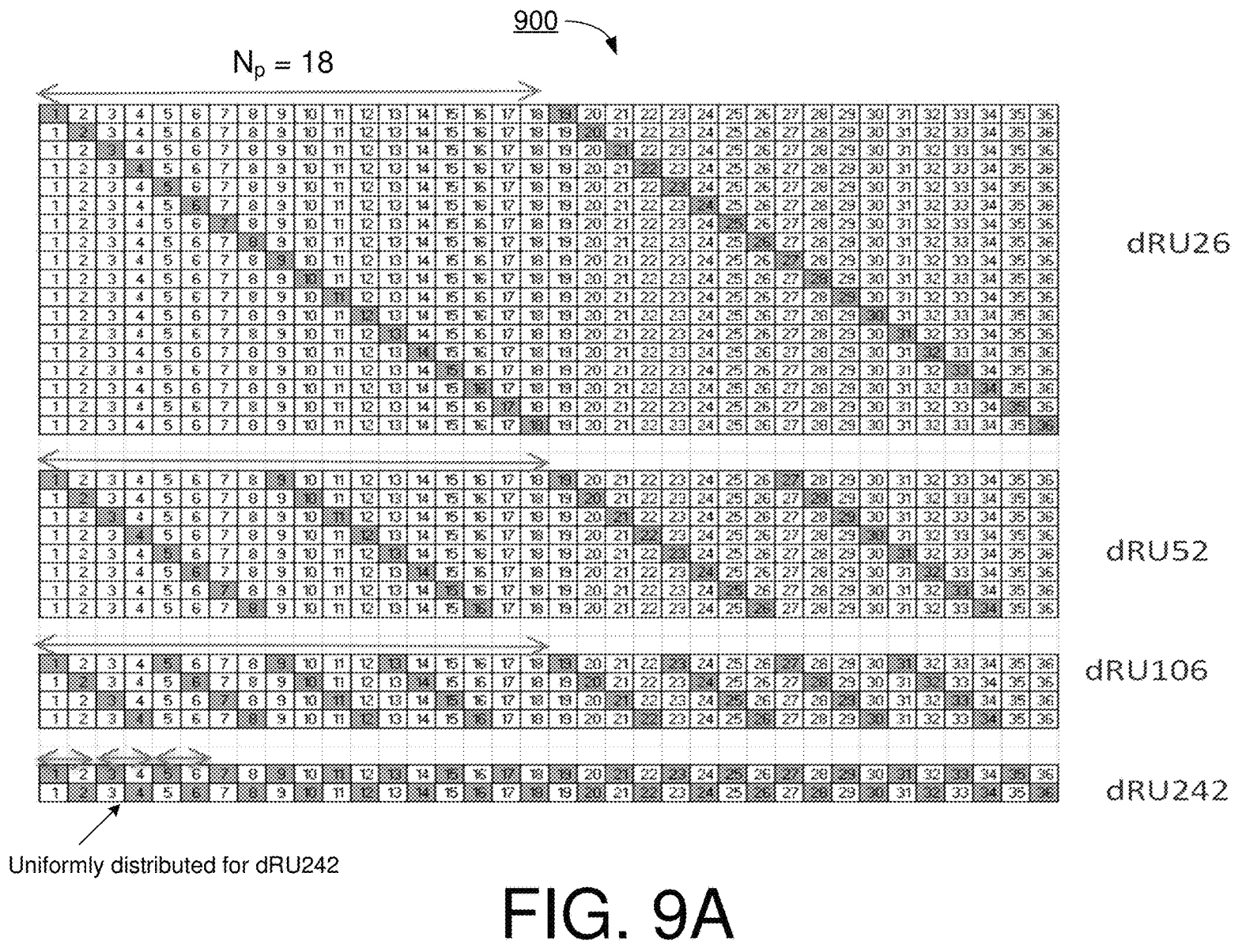

Each of FIGS. 9A and 9B is a diagram of a respective aspect of an example design under a proposed scheme in accordance with the present disclosure.

Figure 10:
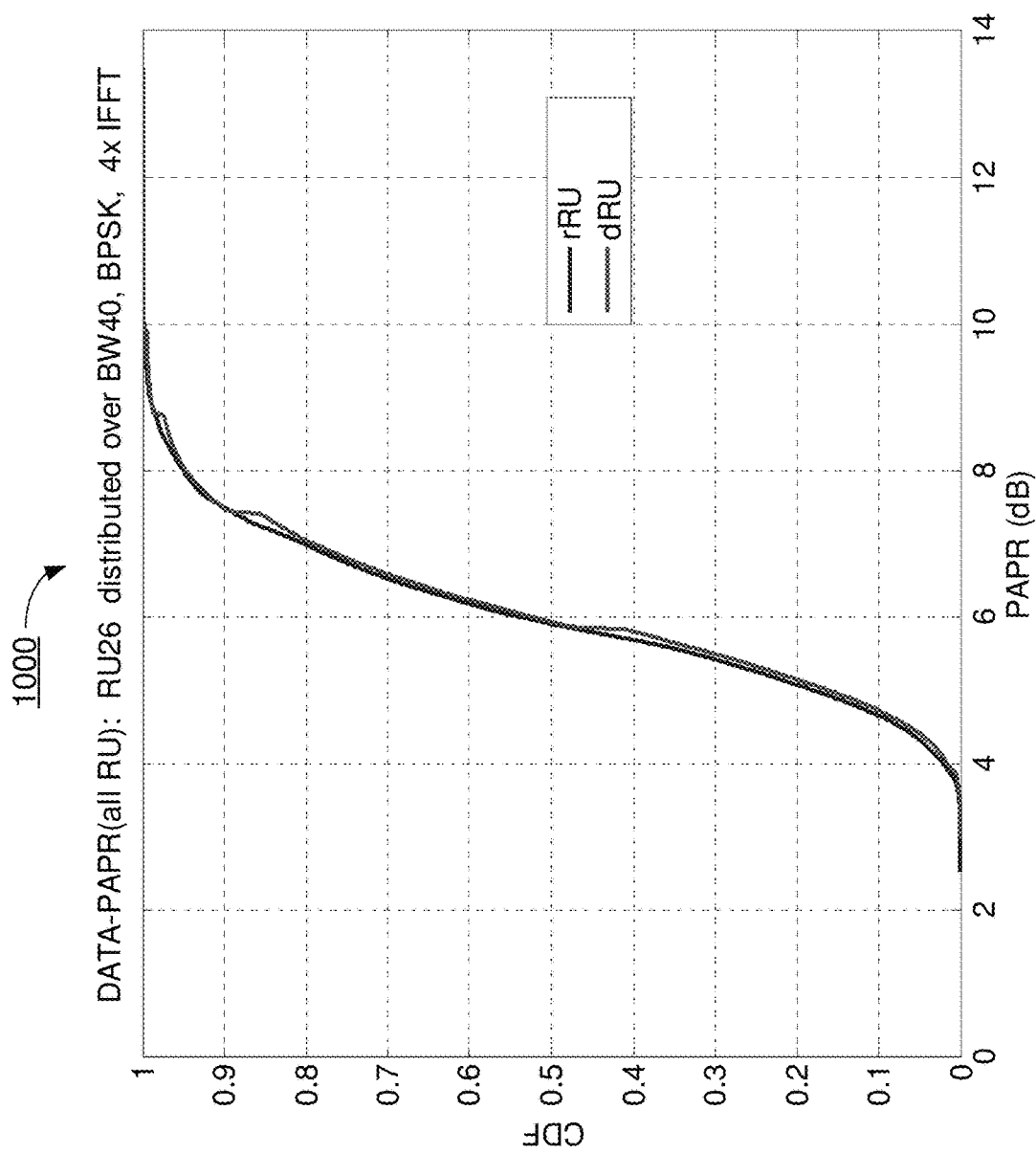

FIG. 10 is a diagram of an example scenario under a proposed scheme in accordance with the present disclosure.

Figure 11:
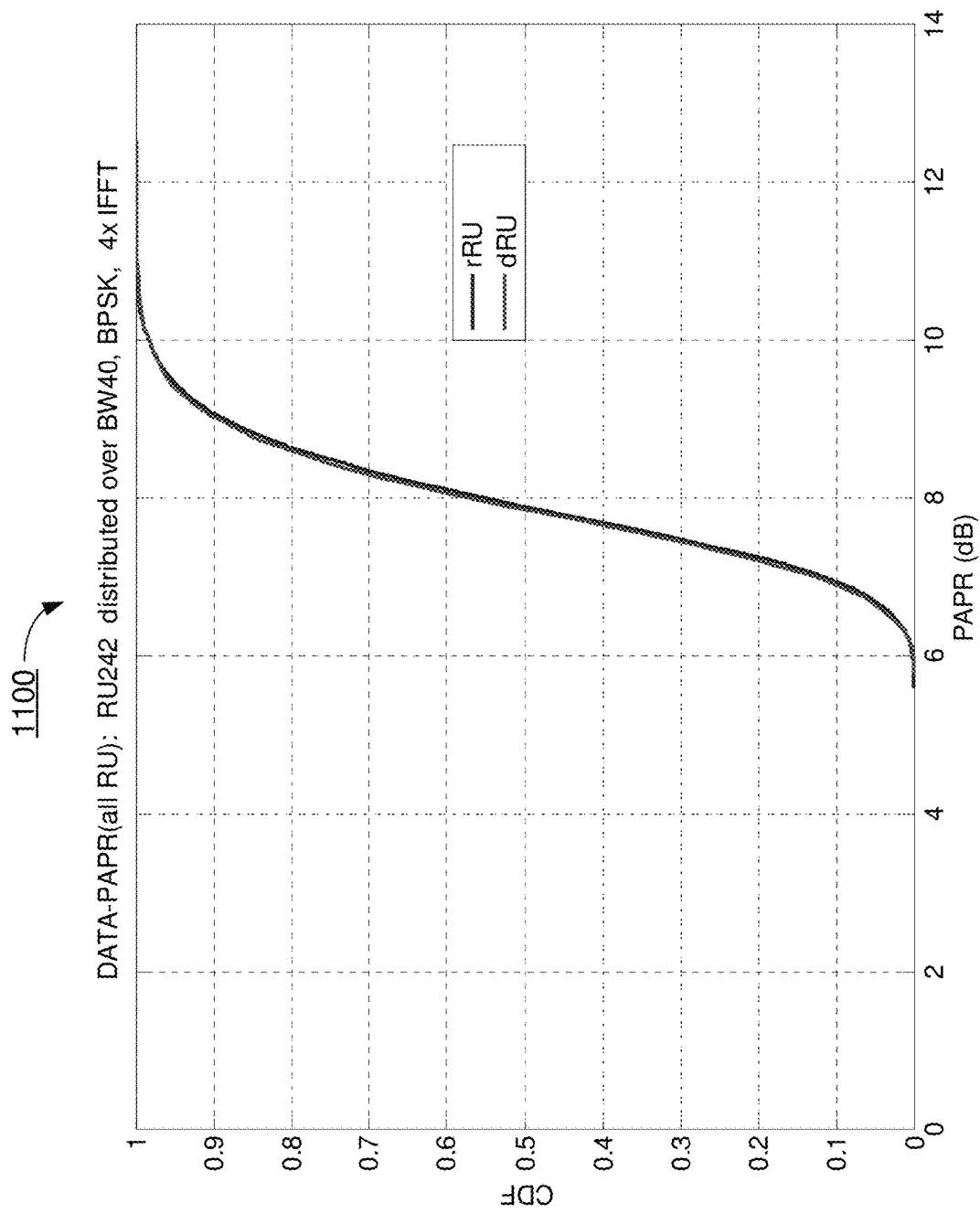

FIG. 11 is a diagram of an example scenario under a proposed scheme in accordance with the present disclosure.

FIG. 12 is a diagram of an example design under a proposed scheme in accordance with the present disclosure.

FIG. 13 is a diagram of an example design under a proposed scheme in accordance with the present disclosure.

Figure 14A:
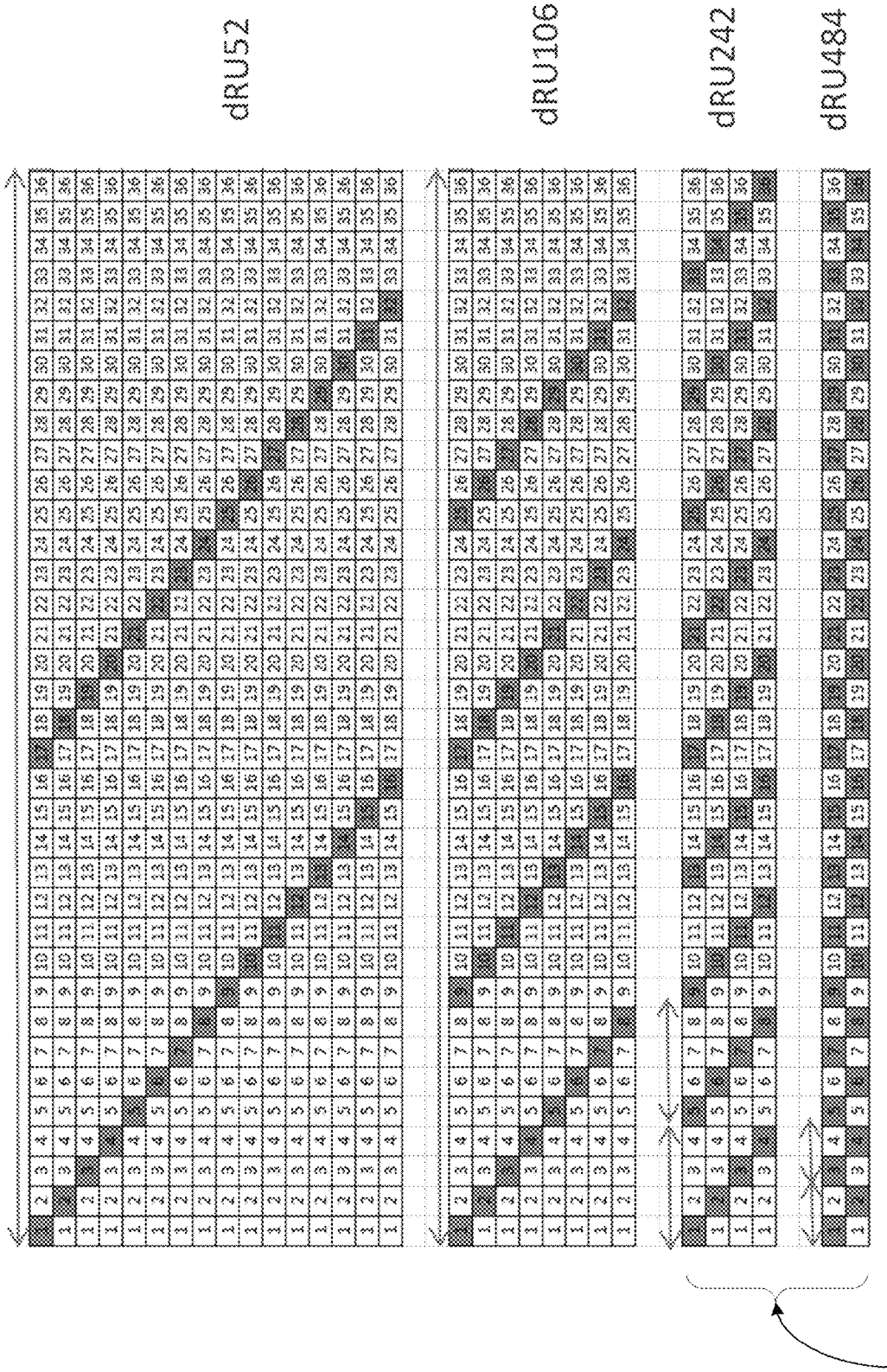

Each of FIGS. 14A and 14B is a diagram of a respective aspect of an example design under a proposed scheme in accordance with the present disclosure.

Figure 15:
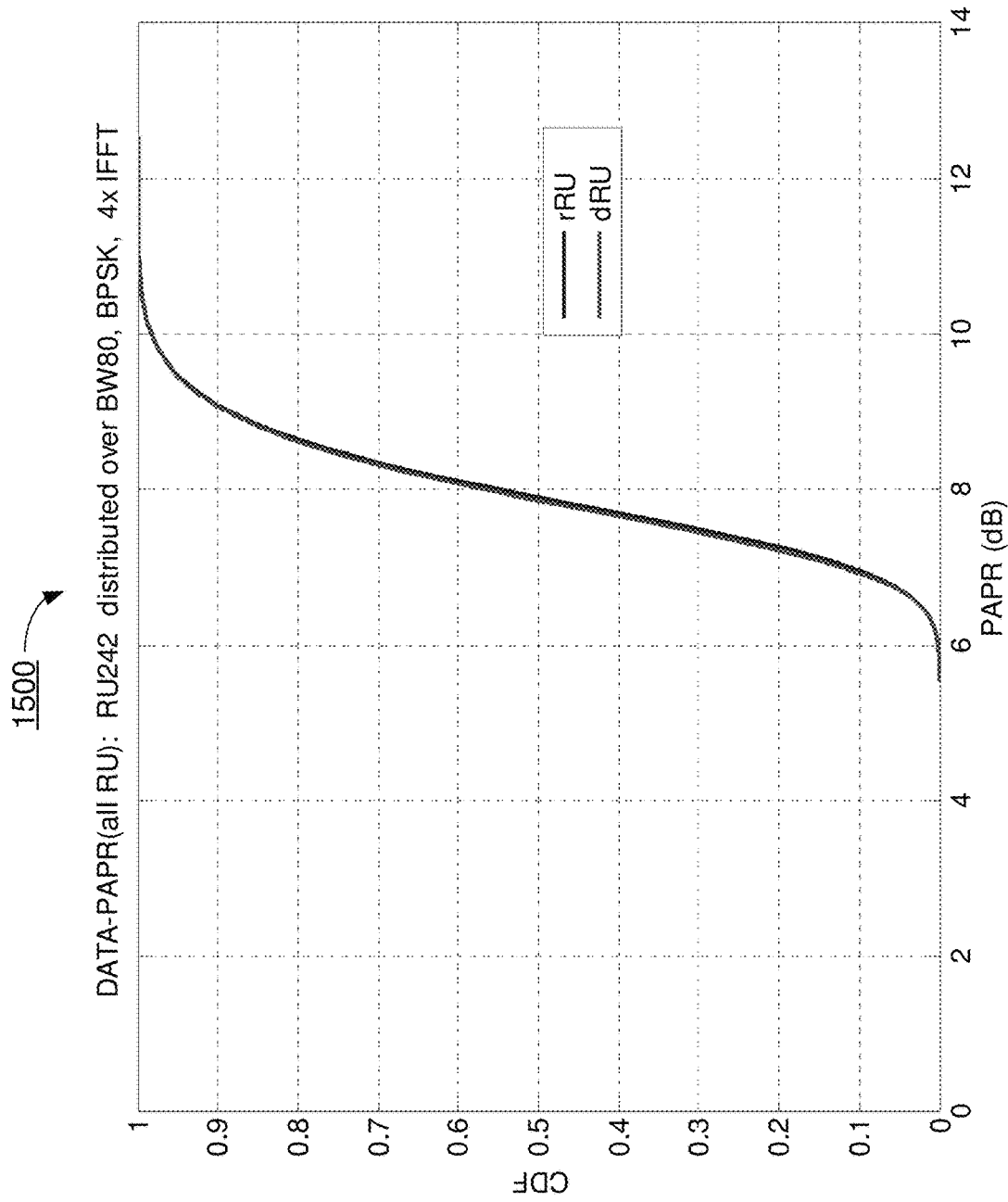

FIG. 15 is a diagram of an example scenario under a proposed scheme in accordance with the present disclosure.

Figure 16:
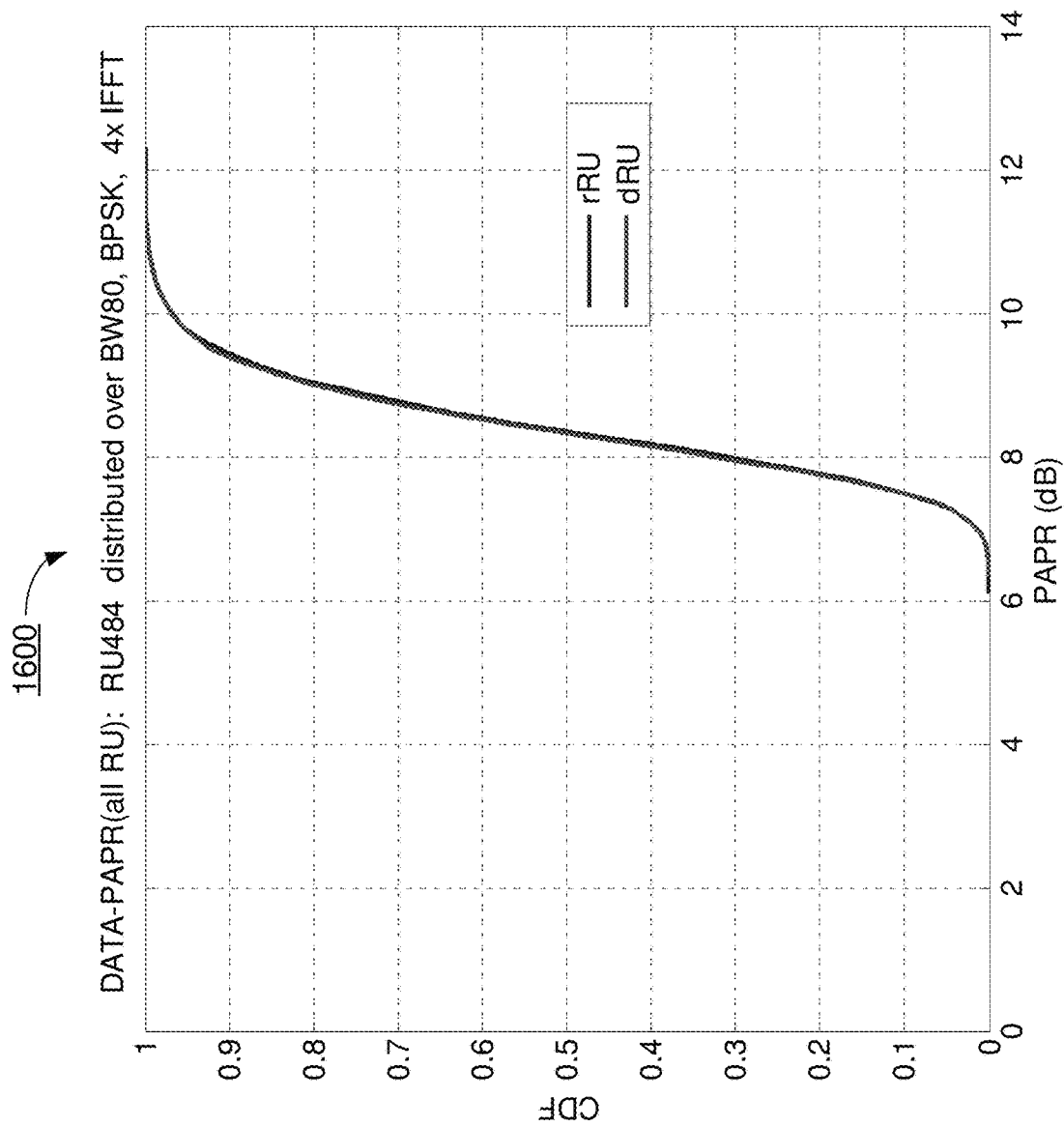

FIG. 16 is a diagram of an example scenario under a proposed scheme in accordance with the present disclosure.

Each of FIG. 17A, FIG. 17B and FIG. 17C is a diagram of a respective portion of an example design under a proposed scheme in accordance with the present disclosure.

FIG. 18 is a diagram of an example design under a proposed scheme in accordance with the present disclosure.

Figure 19A:
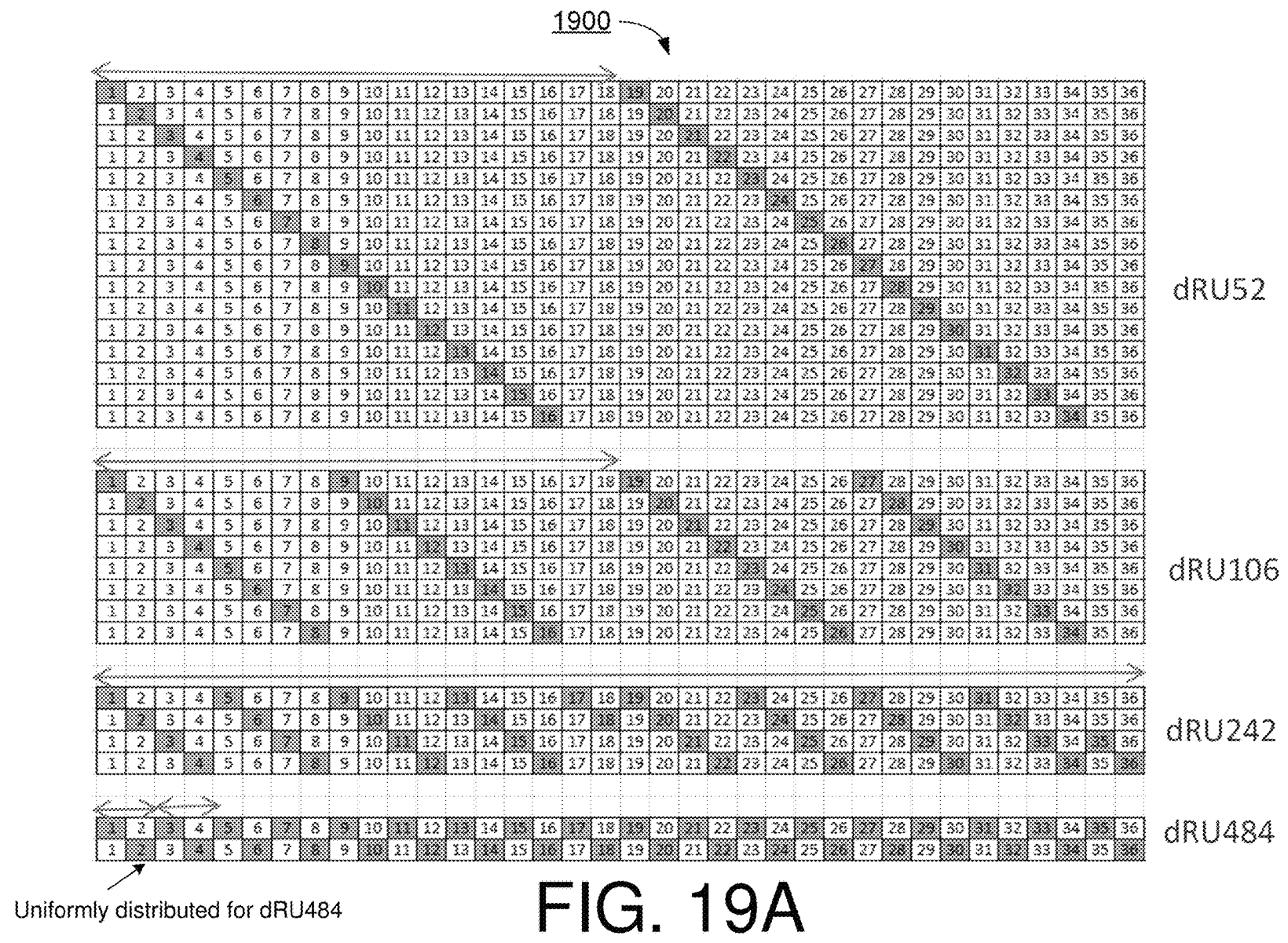

Each of FIG. 19A, FIG. 19B and FIG. 19C is a diagram of a respective aspect of an example design under a proposed scheme in accordance with the present disclosure.

Each of FIG. 20A, FIG. 20B and FIG. 20C is a diagram of a respective portion of an example design under a proposed scheme in accordance with the present disclosure.

FIG. 21 is a diagram of an example design under a proposed scheme in accordance with the present disclosure.

Figure 22:
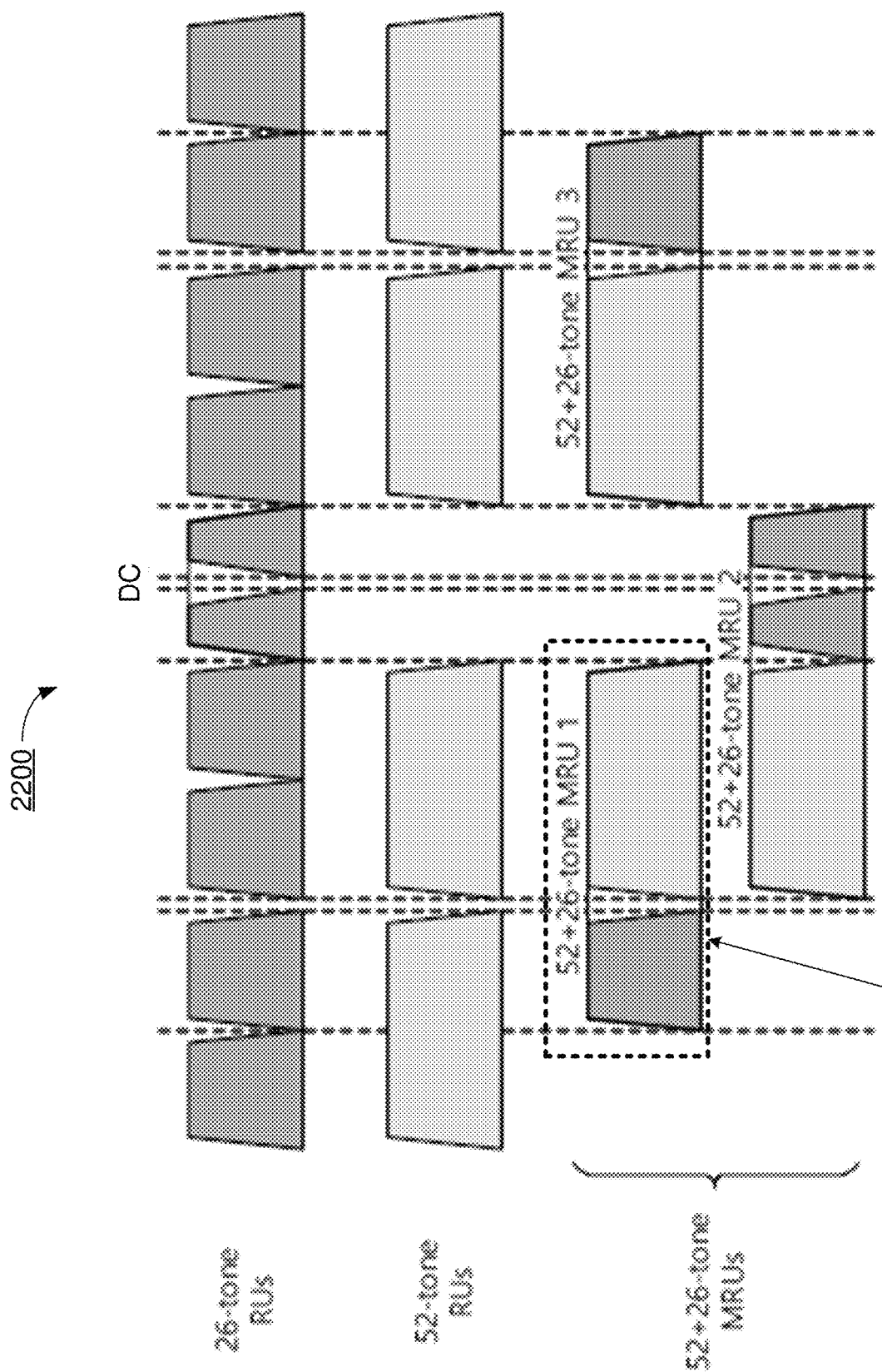

FIG. 22 is a diagram of an example scenario under a proposed scheme in accordance with the present disclosure.

Figure 23:
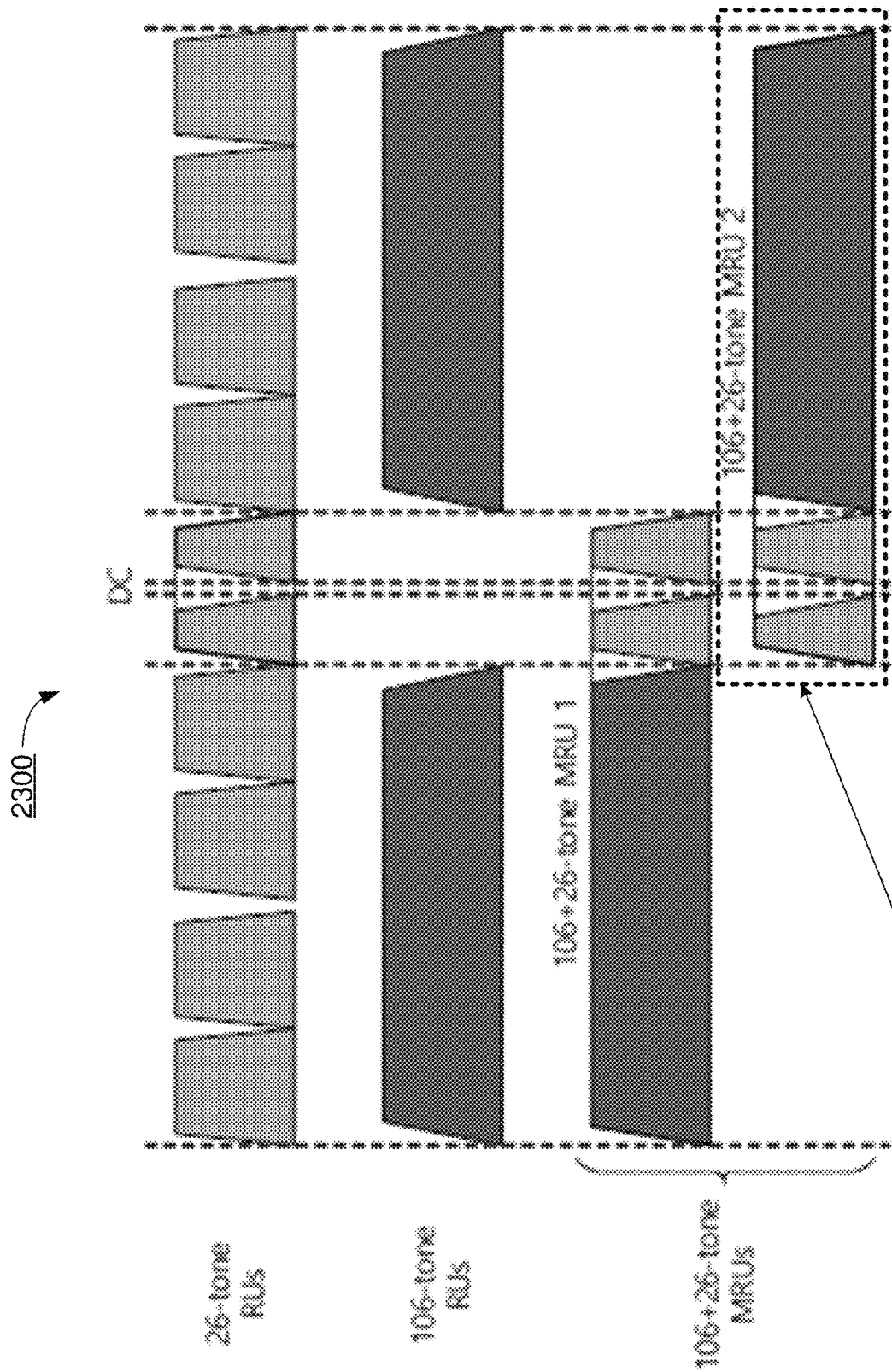

FIG. 23 is a diagram of an example scenario under a proposed scheme in accordance with the present disclosure.

FIG. 24 is a diagram of an example design under a proposed scheme in accordance with the present disclosure.

Figure 25:
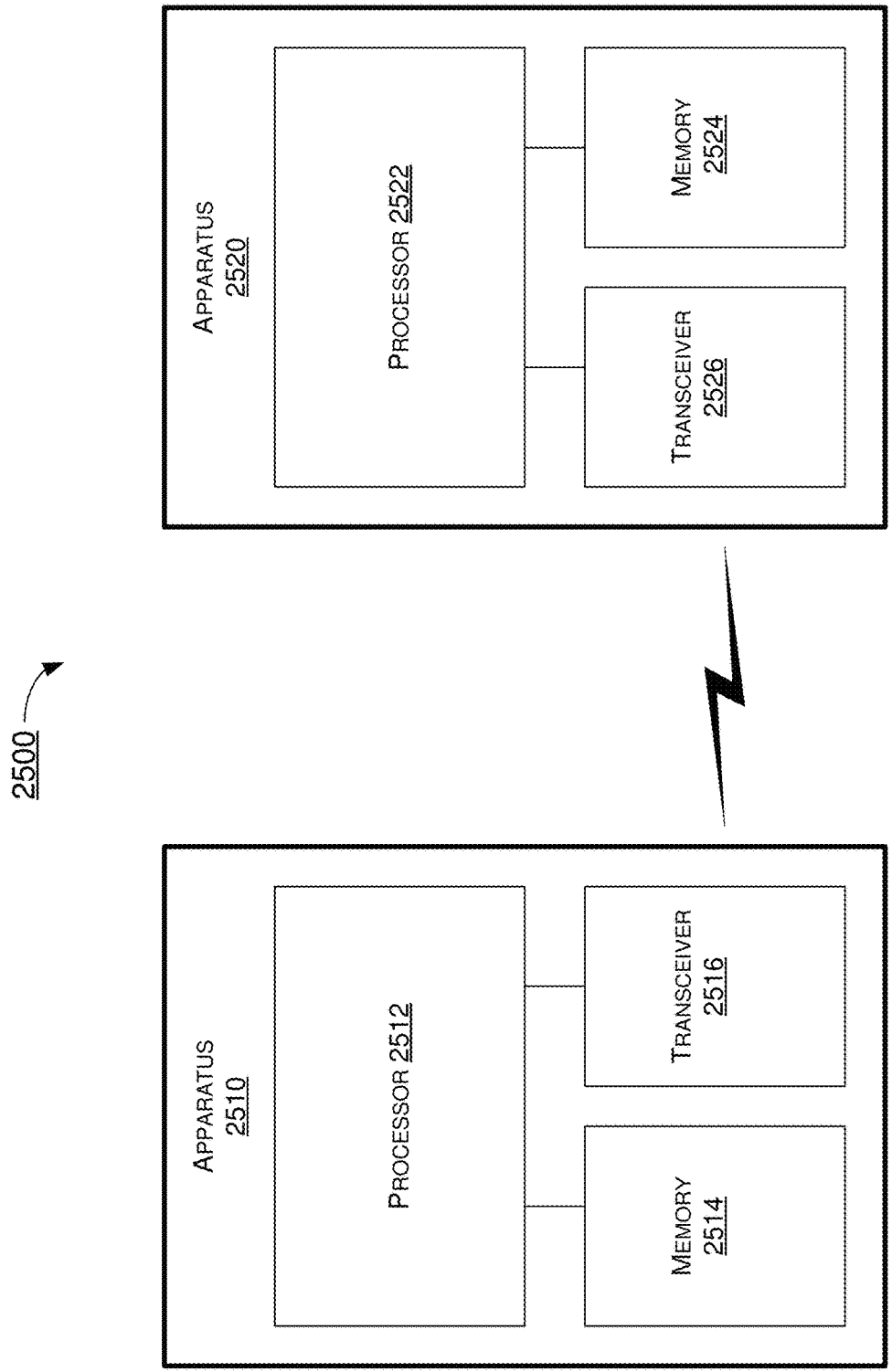

FIG. 25 is a block diagram of an example communication system in accordance with an implementation of the present disclosure.

FIG. 26 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to optimization of distributed RU tone plans for PAPR reduction in 6 GHz LPI systems. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on. Furthermore, in the present disclosure, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on. Additionally, an aggregate (26+52)-tone distributed-tone MRU may be interchangeably denoted as dMRU78, an aggregate (26+106)-tone distributed-tone MRU may be interchangeably denoted as dMRU132, and so on.

Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20, a bandwidth of 40 MHz may be interchangeably denoted as BW40, a bandwidth of 80 MHz may be interchangeably denoted as BW80, a bandwidth of 160 MHz may be interchangeably denoted as BW160, a bandwidth of 240 MHz may be interchangeably denoted as BW240, and a bandwidth of 320 MHz may be interchangeably denoted as BW320. It is further noteworthy that, in the present disclosure, a 26-tone interleaved-tone (or interlaced-tone) RU may be interchangeably denoted as iRU26 as well as dRU26 (26-tone distributed-tone RU), a 52-tone interleaved-tone (or interlaced-tone) RU may be interchangeably denoted as iRU52 as well as dRU52 (52-tone distributed-tone RU), a 106-tone interleaved-tone (or interlaced-tone) RU may be interchangeably denoted as iRU106 as well as dRU106 (106-tone distributed-tone RU), a 242-tone interleaved-tone (or interlaced-tone) RU may be interchangeably denoted as iRU242 as well as dRU242 (242-tone distributed-tone RU), and a 484-tone interleaved-tone (or interlaced-tone) RU may be interchangeably denoted as iRU484 as well as dRU484 (484-tone distributed-tone RU).

Figure 1:
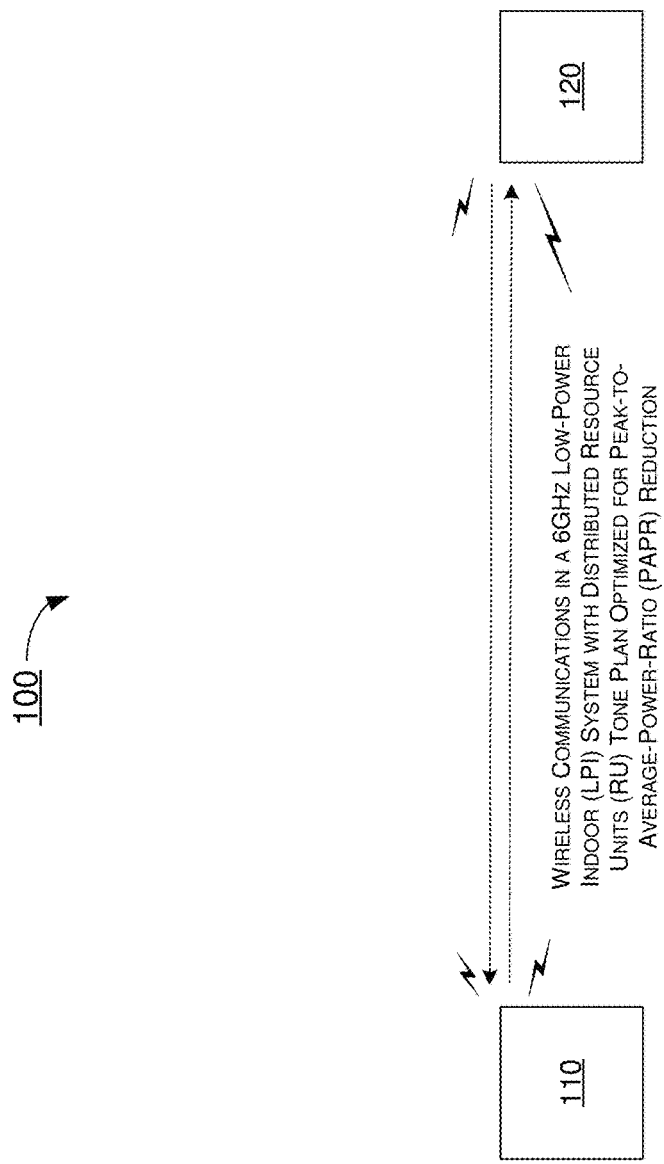
FIG. 1 is a diagram of an example network environment in which various solutions and schemes in accordance with the present disclosure may be implemented.
Figure 2A:
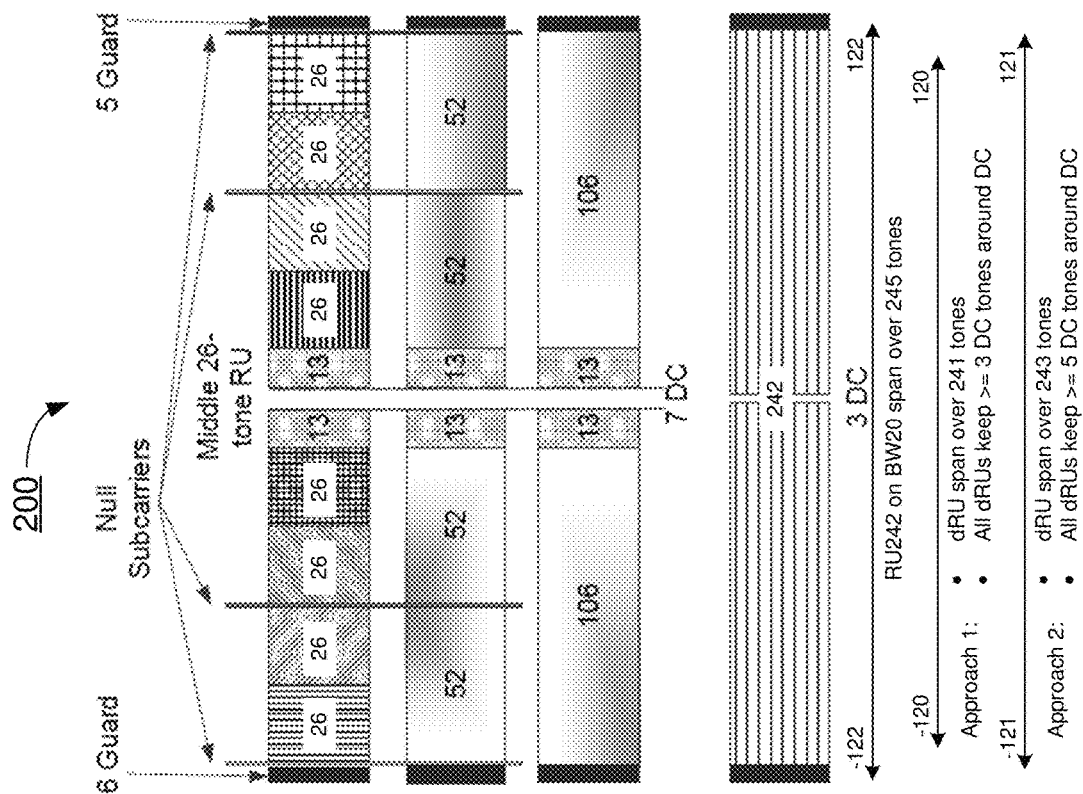
FIG. 2C is a diagram of a respective aspect of an example design under a proposed scheme in accordance with the present disclosure.

FIG. 1 illustrates an example network environment 100 in which various solutions and schemes in accordance with the present disclosure may be implemented. FIG. 2A/B/C~FIG. 26 illustrate examples of implementation of various proposed schemes in network environment 100 in accordance with the present disclosure. The following description of various proposed schemes is provided with reference to FIG. 1~FIG. 26.

Referring to FIG. 1, network environment 100 may involve a communication entity 110 and a communication entity 120 communicating wirelessly (e.g., in a WLAN in accordance with one or more Institute of Electrical and Electronics Engineers (IEEE) 802.11 standards). For instance, communication entity 110 may be a first station (STA) and communication entity 120 may be a second STA, with each of the first STA and second STA functioning as either an access point (AP) STA or a non-AP STA. Under various proposed schemes in accordance with the present disclosure, communication entity 110 and communication entity 120 may be configured to communicate wirelessly with optimization of distributed RU tone plans for PAPR reduction in 6 GHz LPI systems, as described herein.

Figure 2B:
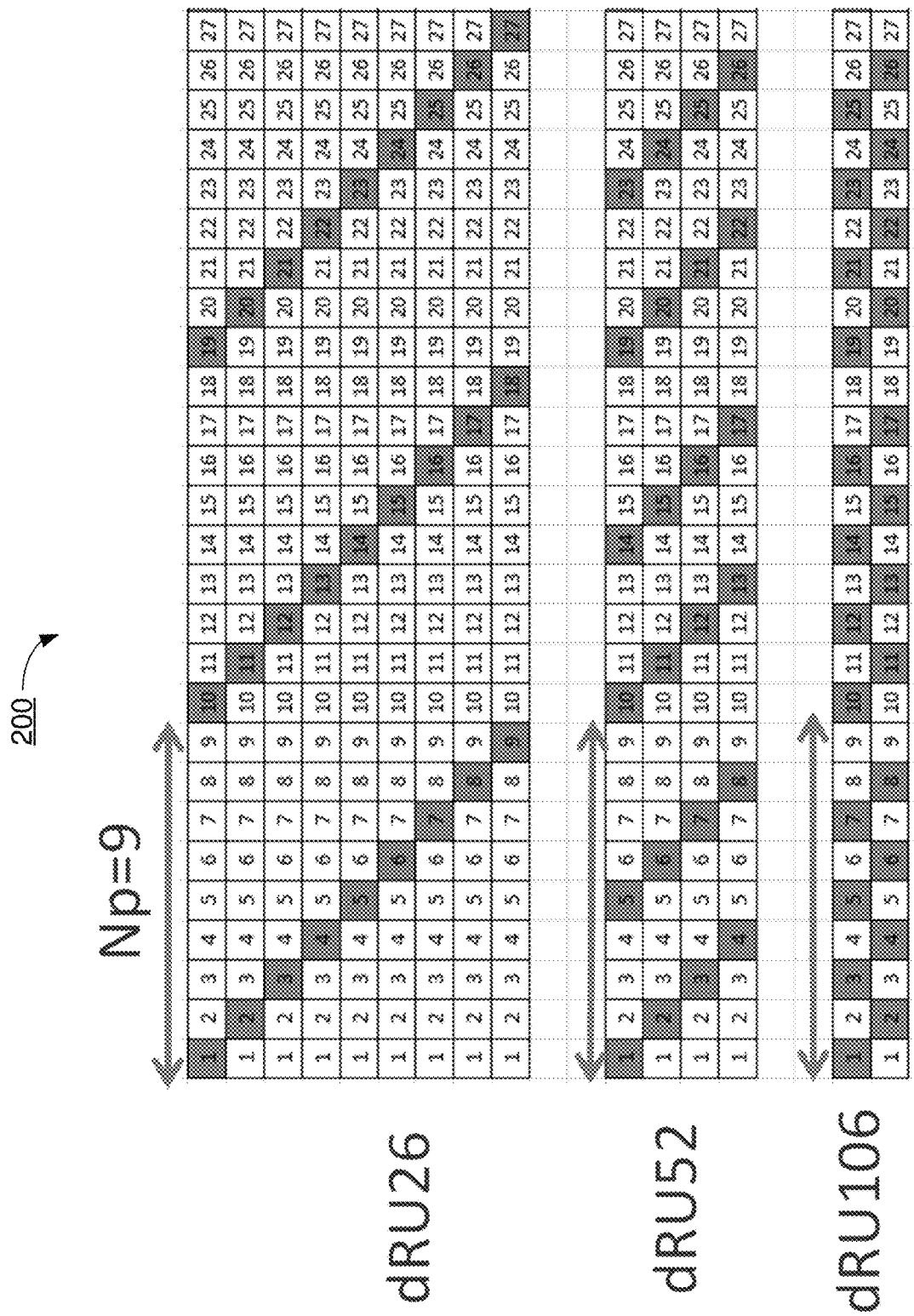

Each of FIG. 2A, FIG. 2B and FIG. 2C illustrates a respective aspect of an example design 200 of a dRU tone plan for BW20 under a proposed scheme in accordance with the present disclosure. Specifically, FIG. 2A shows an example of distribution of a dRU on BW20, FIG. 2B shows an example of dRU tone distribution pattern, and FIG. 2C shows an example of parameters for dRU tone plan generation under this proposed scheme. Referring to FIG. 2A, in a first approach (Approach 1) under the proposed scheme, the dRU tone plan for BW20 may have a tone distribution range over [−120:−2, 2:120] with three DC tones around a center DC tone in the tone distribution range. In a second approach (Approach 2) under the proposed scheme, the dRU tone plan for BW20 may have a tone distribution range over [−121:−3, 3:121] with at least five DC tones around the center DC tone in the tone distribution range to achieve optimal power boost gain. It is believed that the second approach may mitigate performance loss due to a smaller number of DC tones in the first approach. Referring to FIG. 2B, the example of dRU tone distribution pattern is for the case of a periodicity or repetition period, $N_p$, of 9 (or $N_p=9$) for each of dRU26, dRU52 and dRU106. Referring to FIG. 2C, parameters such as $RU_{start}$ and h for BW20 and $N_p=9$ for each of dRU26, dRU52 and dRU106 under this proposed scheme are shown. In the present disclosure, $RU_{start}$ denotes the first or starting tone index for dRU, and denotes the tones within one repetition distance or one repetition period.

Figure 3:
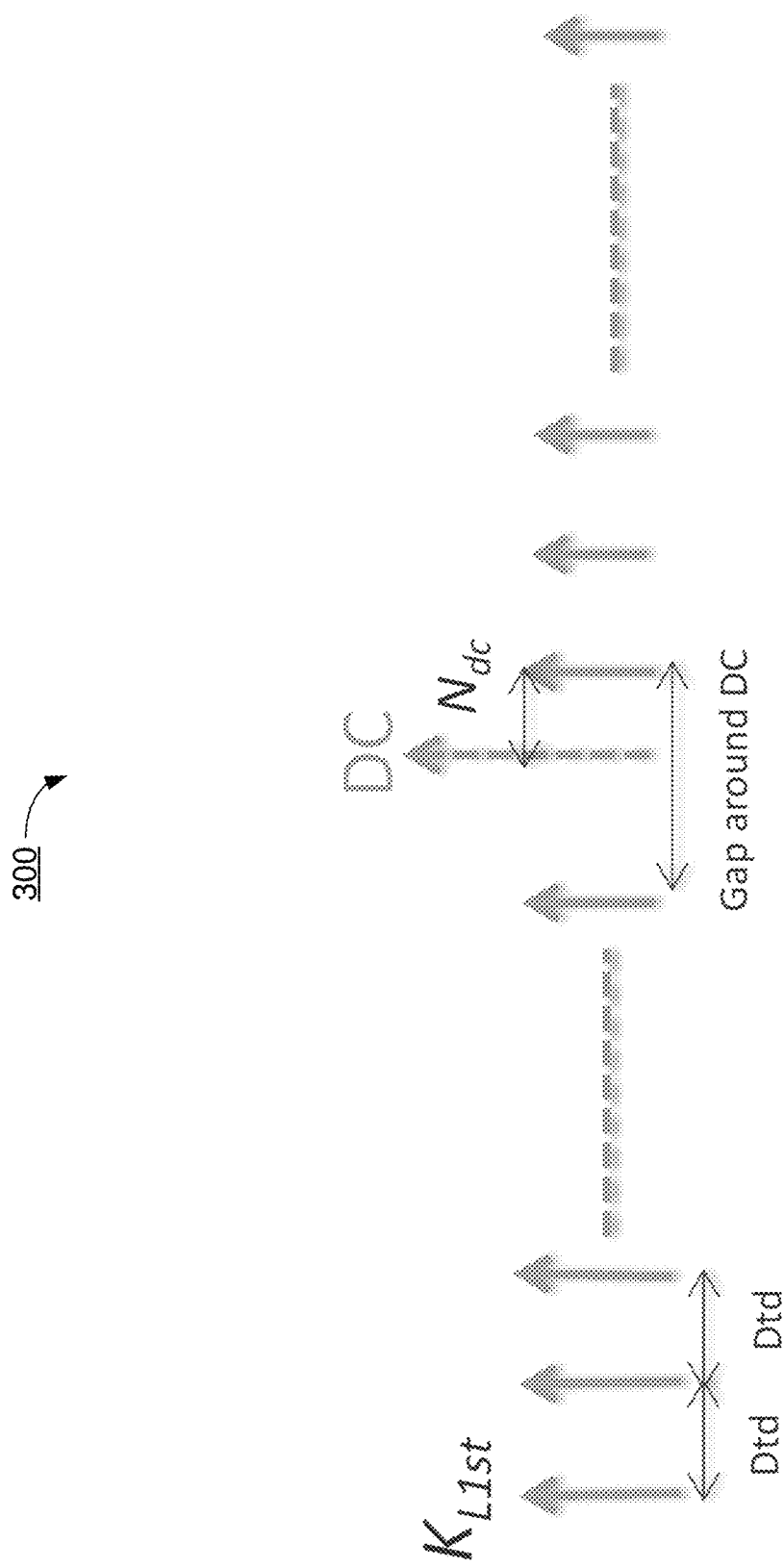
FIG. 3 is a diagram of an example scenario under a proposed scheme in accordance with the present disclosure.
Figure 4:
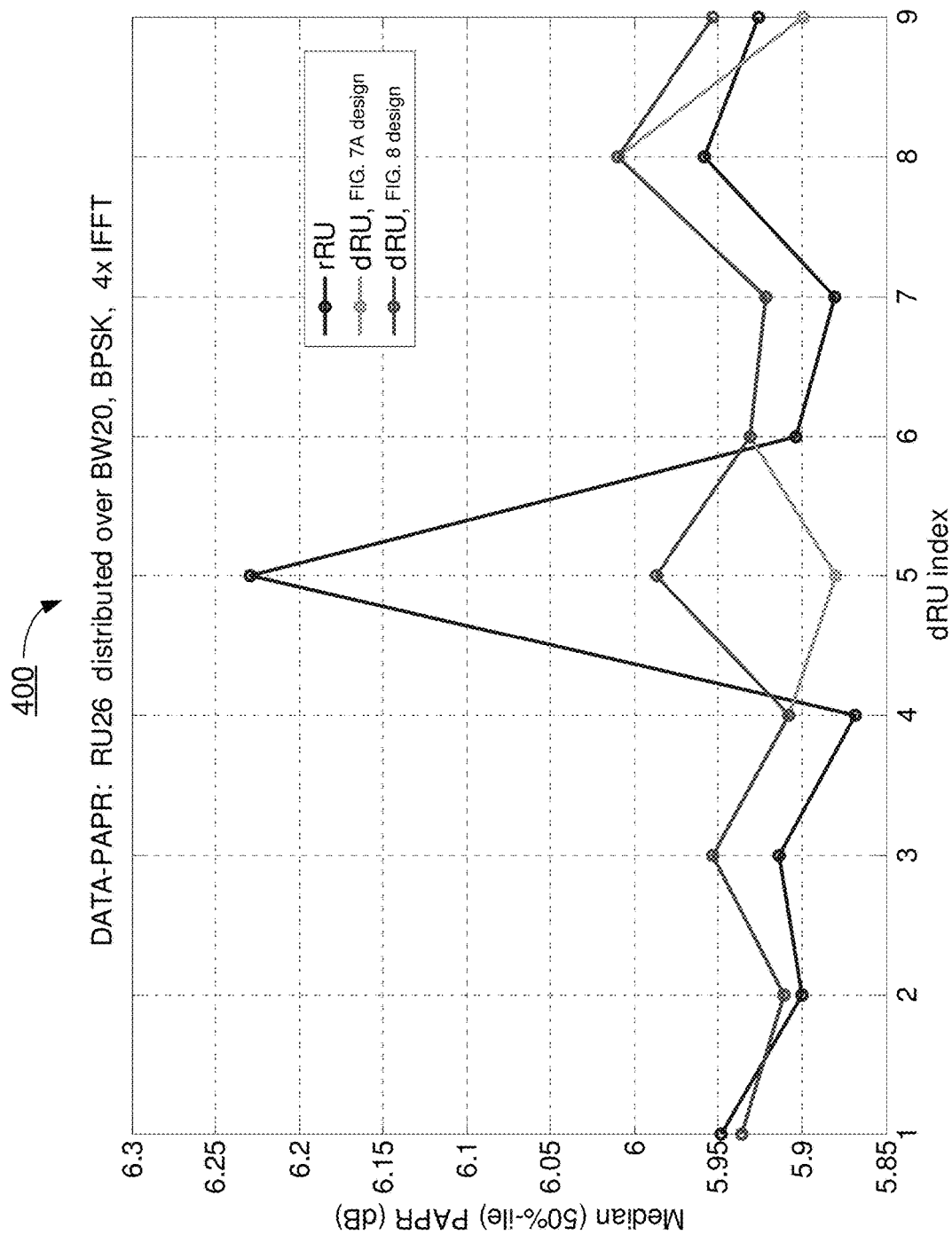
FIG. 4 is a diagram of an example scenario under a proposed scheme in accordance with the present disclosure.
Figure 5:
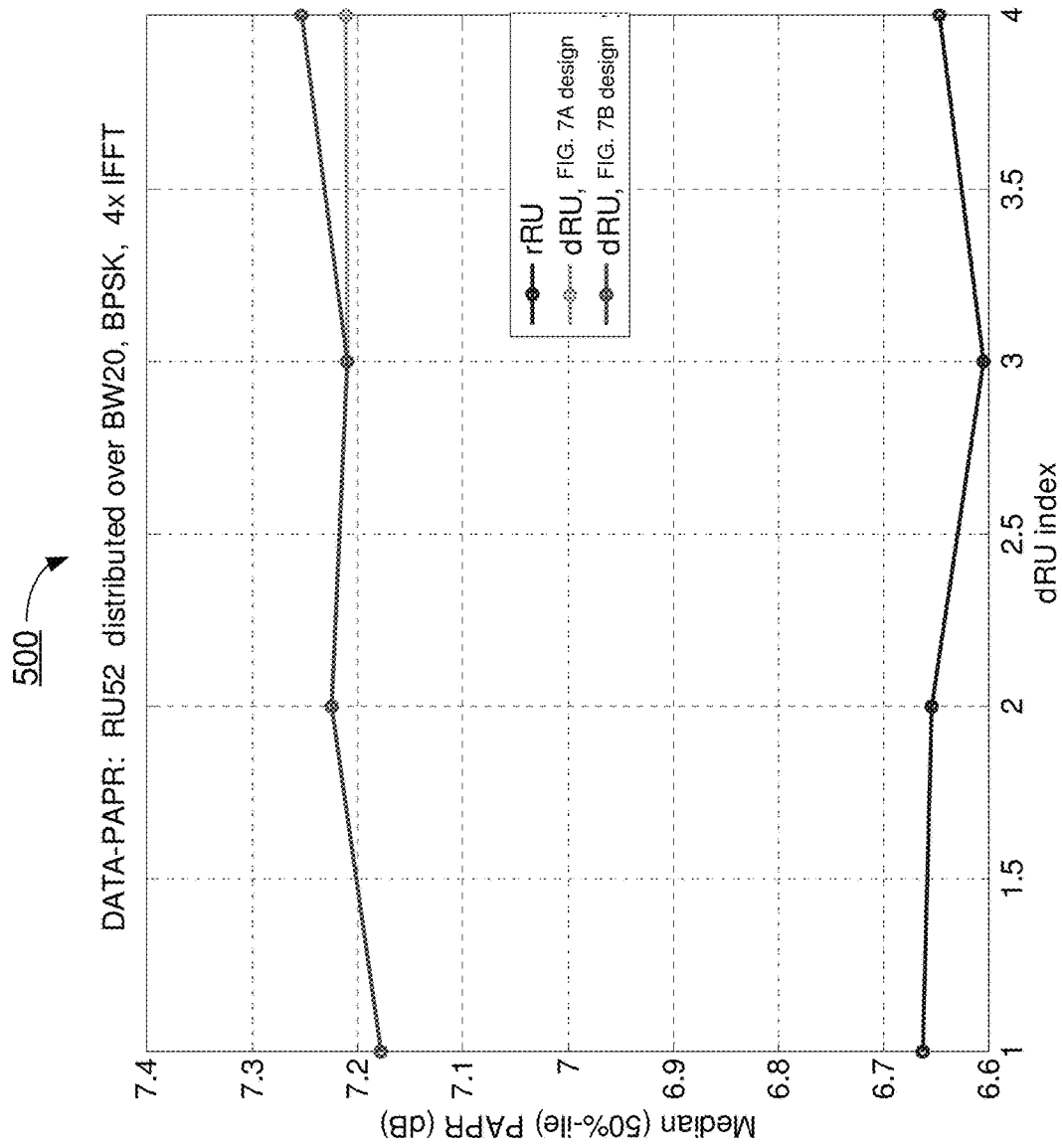
FIG. 5 is a diagram of an example scenario under a proposed scheme in accordance with the present disclosure.
Figure 6:
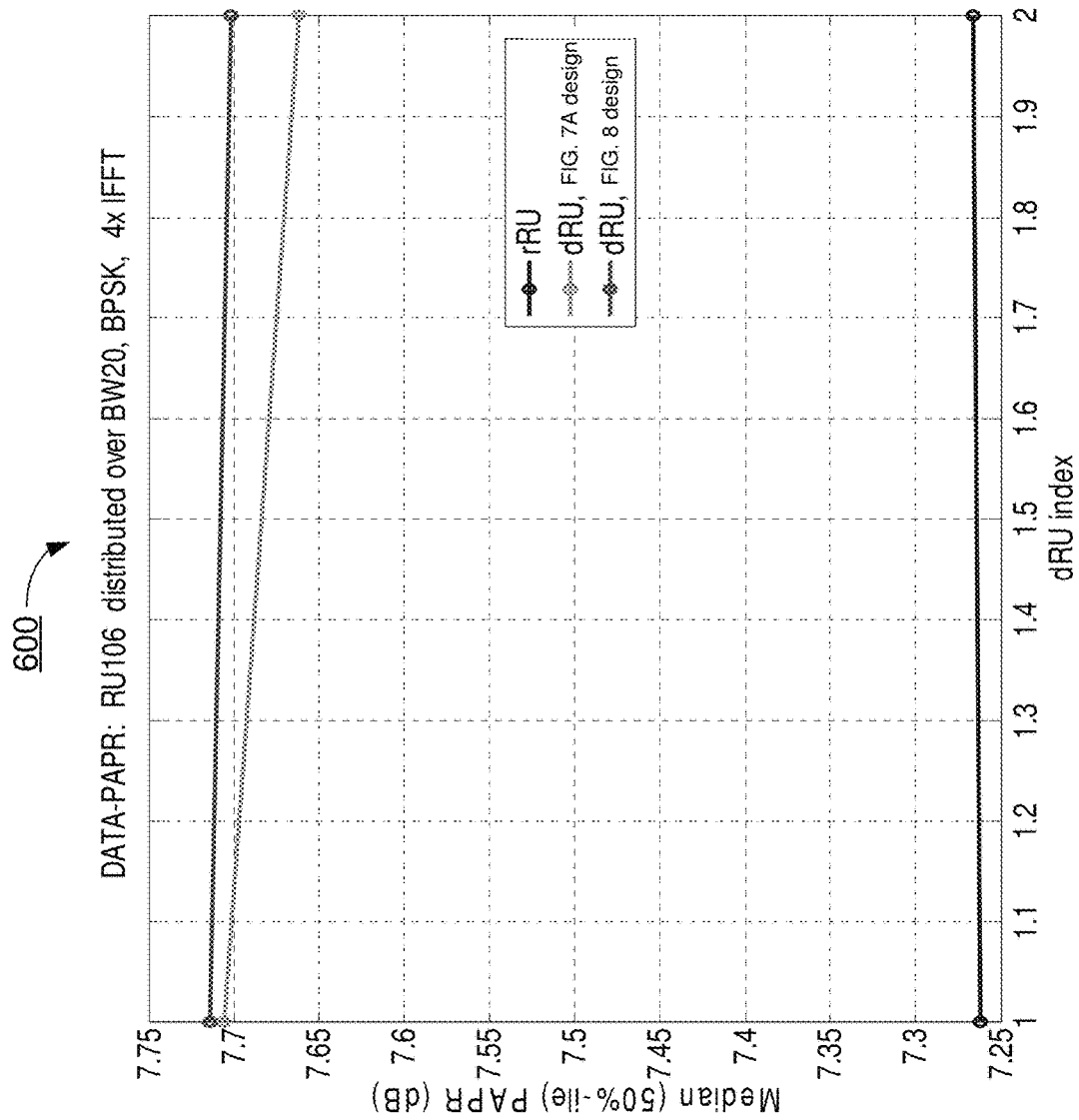
FIG. 6 is a diagram of an example scenario under a proposed scheme in accordance with the present disclosure.

Under a proposed scheme in accordance with the present disclosure with respect to PAPR reduction, dRU on BW20 may be spread over a tone distribution range of [−120:−2, 2:120] or [−121:−3, 3:121] to achieve optimal power boost gain. It is believed that, after the optimization of dRU tone plan, a 26-tone dRU may achieve a similar PAPR as does a regular RU. Under the proposed scheme, several different approaches may be used for PAPR reduction for dRU over BW20. FIG. 3 illustrates an example scenario 300 under the proposed scheme. Each of FIG. 4, FIG. 5 and FIG. 6 illustrates an example scenario 400, 500 or 600, respectively, of PAPR reduction performance for a dRU of a respective size on BW20 under the proposed scheme. FIG. 7A illustrates an example design 700A of a dRU tone plan for BW20 under a first option (Option 1) of the proposed scheme. FIG. 7B illustrates an example design 700B of another dRU tone plan for BW20 under Option 1 of the proposed scheme. FIG. 8 illustrates an example design 800 of a dRU tone plan for BW20 under a second option (Option 2) of the proposed scheme.

Referring to FIG. 3, one approach may involve searching different combinations of $K_{LIst}$ (index of the first left-hand side dRU subcarrier or tone on the left side of tone distribution) and $N_{dc}$ (number of DC tones) based on dRU generation formula and find the combination of the parameters that achieves the lowest PAPR. Another approach may involve creating a gap around a number of DC tones with the gap being multiple times of a dRU tone separation distance ($D_{td}$), which is also in terms of number of tones. For instance, the gap around DC=$n*D_{td}$, with n denoting a multiplication factor and n=1, 2, 3, 4, . . . For the example of 26-tone dRU of FIG. 7A, the $D_{td}$ is 9, and the gap is 18 (i.e., from "−12" to "6") for the dRU1. For dRU on BW20, $D_{td}=9$ for dRU26 on BW20 may be implemented, with n=3 or n=2 or n=1 for PAPR reduction. This similar rule may be applied to dRU on BW40 and BW80. FIG. 4 shows an example scenario 400 of PAPR reduction performance for dRU26 on BW20. FIG. 5 shows an example scenario 500 of PAPR reduction performance for dRU52 on BW20. FIG. 6 shows an example scenario 600 of PAPR reduction performance for dRU106 on BW20. FIG. 7A shows an example design 700A of a dRU tone plan of data and pilot subcarrier (or tone) indices for dRU26, dRU52 and dRU106 with $N_p=9$ in a 20 MHz extremely-high-throughput (EHT) trigger-based (TB) physical-layer protocol data unit (PPDU) for a 6 GHZ LPI system. FIG. 7B shows an example design 700B of a dRU tone plan of data and pilot subcarrier (or tone) indices for dRU26, dRU52 and dRU106 with $N_p=9$ in a 20 MHz EHT TB PPDU for a 6 GHZ LPI system. FIG. 8 shows an example design 800 of a dRU tone plan of data and pilot subcarrier (or tone) indices for dRU26, dRU52 and dRU106 with $N_p=9$ in a 20 MHz EHT TB PPDU for a 6 GHZ LPI system. In the table of each of FIG. 7A, FIG. 7B and FIG. 8, i denotes a dRU index on BW20 or on a frequency segment or subblock.

Under a proposed scheme in accordance with the present disclosure, several different approaches may be used for PAPR reduction for dRU over BW40. Each of FIGS. 9A and 9B illustrates a respective aspect of an example design 900 of a dRU tone plan for BW40 under the proposed scheme. Each of FIG. 10 and FIG. 11 illustrates an example scenario 1000 or 1100, respectively, of PAPR reduction performance for a dRU of a respective size on BW40 under the proposed scheme. FIG. 12 illustrates an example design 1200 of a dRU tone plan for BW40 under a first option (Option 1) of the proposed scheme. FIG. 13 illustrates an example design 1300 of a dRU tone plan for BW40 under a second option (Option 2) of the proposed scheme.

Referring to FIG. 9A, the example of dRU tone distribution pattern is for the case of $N_p=18$ for each of dRU26, dRU52, dRU106 and dRU242 on BW40. It can be seen that, for dRU242, the tones may be uniformly distributed under this proposed scheme. It is believed that implementation of the proposed scheme may achieve perfect uniformity in tone distribution for dRU242 on BW40. Referring to FIG. 9B, parameters such as $RU_{start}$ and h for BW40 and $N_p=18$ for each of dRU26, dRU52, dRU106 and dRU242 on BW40 under this proposed scheme are shown. FIG. 10 shows an example scenario 1000 of PAPR reduction performance for dRU26 on BW40, and FIG. 11 shows an example scenario 1100 of PAPR reduction performance for dRU242 on BW40. As can be seen, after optimization under this proposed scheme, both 26-tone dRU and 242-tone dRU may achieve similar PAPR as that of a rRU on BW40. FIG. 12 shows an example design 1200 of a dRU tone plan of data and pilot subcarrier (or tone) indices for dRU26, dRU52, dRU106 and dRU242 with $N_p=18$ in a 40 MHz EHT TB PPDU for a 6 GHZ LPI system. FIG. 13 shows an example design 1300 of a dRU tone plan of data and pilot subcarrier (or tone) indices for dRU26, dRU52, dRU106 and dRU242 with $N_p=18$ in a 40 MHz EHT TB PPDU for a 6 GHZ LPI system.

Under a proposed scheme in accordance with the present disclosure, two options (Option 1 and Option 2) may be utilized for PAPR reduction for dRU over BW80. Each of FIGS. 14A and 14B illustrates a respective aspect of an example design 1400 of a dRU tone plan for BW80 under Option 1 of the proposed scheme. Each of FIG. 15 and FIG. 16 illustrates an example scenario 1500 or 1600, respectively, of PAPR reduction performance for a dRU of a respective size on BW80 under Option 1 of the proposed scheme. Each of FIG. 17A, FIG. 17B and FIG. 17C illustrates a respective portion of an example design 1700 of a dRU tone plan for BW80 under Option 1 of the proposed scheme. FIG. 18 illustrates an example design 1800 of a dRU tone plan for BW80 under Option 1 of the proposed scheme.

Referring to FIG. 14A, the example of dRU tone distribution pattern is for the case of $N_p=36$ for each of dRU26, dRU52, dRU106, dRU242 and dRU484. It can be seen that, for dRU242 and dRU484, the tones may be uniformly distributed under this proposed scheme. Thus, implementation of the proposed scheme may achieve perfect uniformity in tone distribution for dRU242 and dRU484 on BW80. Referring to FIG. 14B, parameters such as $RU_{start}$ and h for BW80 and $N_p=36$ for each of dRU26, dRU52, dRU106, dRU242 and dRU484 under this proposed scheme are shown. In the table shown in FIG. 14B, V=[0, 16, 8, 24, 32, 4, 20, 12, 28, 6, 22, 14, 30, 34, 2, 18, 10, 26]. Advantageously, the proposed scheme may achieve optimal power boost gains for dRUs of all the listed sizes, and all dRUs may be repeatable. FIG. 15 shows an example scenario 1500 of PAPR reduction performance for dRU242 on BW80, and FIG. 16 shows an example scenario 1600 of PAPR reduction performance for dRU484 on BW80. As can be seen, after optimization under this proposed scheme, both 242-tone dRU and 484-tone dRU may achieve similar PAPR as that of a rRU on BW80. Each of FIG. 17A, FIG. 17B and FIG. 17C shows a respective portion of an example design 1700 of a dRU tone plan of data and pilot subcarrier (or tone) indices for dRU26, dRU52, dRU106, dRU242 and dRU484 with $N_p=36$ in an 80 MHz EHT TB PPDU for a 6 GHZ LPI system. FIG. 18 shows an example design 1800 of a dRU tone plan of data and pilot subcarrier (or tone) indices for dRU52, dRU106, dRU242 and dRU484 in an 80 MHz EHT TB PPDU for a 6 GHZ LPI system.

Each of FIGS. 19A, 19B and 19C illustrates a respective aspect of an example design 1900 of a dRU tone plan for BW80 under Option 2 of the proposed scheme. Each of FIG. 20A, FIG. 20B and FIG. 20C illustrates a respective portion of an example design 2000 of a dRU tone plan for BW80 under Option 2 of the proposed scheme. FIG. 21 illustrates an example design 2100 of a dRU tone plan for BW80 under Option 2 of the proposed scheme.

Referring to FIG. 19A, the example of dRU tone distribution pattern is for the case of $N_p=36$ for each of dRU52, dRU106, dRU242 and dRU484. It can be seen that, for dRU484, the tones may be uniformly distributed under this proposed scheme. It can also be seen that there are two distribution patterns for dRU242 and one distribution pattern for dRU484. Thus, implementation of the proposed scheme may achieve perfect uniformity in tone distribution for dRU484 on BW80. Referring to FIG. 19B and FIG. 19C, parameters such as $RU_{start}$ and h for BW80 and $N_p=36$ for each of dRU26, dRU52, dRU106, dRU242 and dRU484 under this proposed scheme are shown. In the table shown in FIG. 19B, V=[0, 18, 8, 26, 16, 4, 22, 12, 30, 2, 20, 10, 28, 34, 6, 24, 4, 32]. In the table shown in FIG. 19C, V=[2, 20, 10, 28, 18, 6, 24, 14, 32, 4, 22, 12, 30, 0, 8, 26, 16, 34]. Advantageously, the proposed scheme may achieve optimal power boost gains for dRUs of all the listed sizes, and all dRUs may be repeatable. Each of FIG. 20A, FIG. 20B and FIG. 20C shows a respective portion of an example design 2000 of a dRU tone plan of data and pilot subcarrier (or tone) indices for dRU26, dRU52, dRU106, dRU242 and dRU484 with $N_p=36$ in an 80 MHz EHT TB PPDU for a 6 GHZ LPI system. FIG. 21 shows an example design 2100 of a dRU tone plan of data and pilot subcarrier (or tone) indices for dRU52, dRU106, dRU242 and dRU484 in an 80 MHz EHT TB PPDU for a 6 GHZ LPI system.

Under a proposed scheme in accordance with the present disclosure, in addition to or in lieu of using tone tables shown in the figures and described above, dRU subcarrier indices may be calculated or otherwise generated by using the following formula:

$$\begin{cases} K_{L1st} + k_{td}(r, k), & \text{for } k = 0, 1, 2, \ldots, \frac{N_{st}}{2} - 1 \\ N_{dc} + k_{td}\left(r, k - \frac{N_{st}}{2}\right), & \text{for } k = \frac{N_{st}}{2}, \frac{N_{st}}{2} + 1, \ldots, N_{st} - 1 \end{cases}$$

In the above formula, $k_{td}$ denotes a tone distribution pattern generated under the proposed scheme. Moreover, $K_{L1st}$ and $N_{dc}$ may be bandwidth dependent, and different dRU tone plans may be generated or optimized based on this formula. Under the proposed scheme, given a distribution bandwidth and a logical RU size, the tone distribution pattern of a dRU may be generated based on a formula as follows:

$$K_{td}(r,k) = RU_{start}(r) + l_{(i)} + j*N_p$$

Here, $N_p$ denotes a periodicity or repetition period (e.g., in number of tones); $l_{(i)}$ denotes a tone distribution pattern within one repetition period (e.g., every two or three tones, and so on); $i = \text{mod}(k, L) = 0, 1, 2, \ldots, L-1$; $j = 0, 1, 2, \ldots,$ $$\left\lceil \frac{N_{st\_ru}}{2L} \right\rceil - 1;$$

$k=0, 1, 2, \ldots, (N_{st\_ru}/2)-1$; $r=1, 2, \ldots, N_{ru}$, with r being the logical RU index. Moreover, $l_{(i)} \in \Omega_{ru} = \{l_{(0)}, T_{(1)}, \ldots, l_{(L-1)}\}$; $L=|\Omega_{ru}|$; $N_{st\_ru}=26, 52, 106, 242$ and $484$, for RU26, RU52, RU106, RU242 and RU484, respectively. Additionally, $RU_{start}(r)$ represents the first or starting tone index for dRUr; $l_{(i)}$ represents the tones within one repetition distance or one repetition period; $N_p$ represents the repetition distance or repetition period; L represents the number of tones within one repetition distance or one repetition period; $N_{st\_ru}$ represents the number of subcarriers (or tones) for a dRU; and $N_{ru}$ represents the number of dRUs for a given dRU size in a given bandwidth. These parameters may be defined for different bandwidths.

It is noteworthy that various schemes proposed herein with respect to dRU tone plans may also be applied an aggregation of multiple RUs to achieve distribution of tones for MRU, or dMRU. FIG. 22 illustrates an example scenario 2200 of a dMRU under a proposed scheme in accordance with the present disclosure. FIG. 23 illustrates an example scenario 2300 of another dMRU under a proposed scheme in accordance with the present disclosure. FIG. 24 illustrates an example design 2400 under a proposed scheme in accordance with the present disclosure.

Referring to FIG. 22 and FIG. 23, in BW20, there may be three allowed MRU(52+26), and there may be two allowed MRU(106+26). Under a first approach of the proposed scheme, the same combinations of dMRUs may be supported as for regular MRUs (rMRUs) such as, for example, three dMRU(52+26) and two dMRU(106+26). Similar with rMRUs, dMRU78_1=dRU52_2+dRU26_2, dMRU78_2=dRU52_2+dRU26_5, dMRU78_3=dRU52_3+dRU26_8, dMRU132_1=dRU106_1+dRU26_5, and dMRU132_2=dRU106_2+dRU26_5. Here, dMRU78=dMRU(52+26) and dMRU132=dMRU(106+26). The same principles may be applied to dMRU78 and dMRU132 for BW40 and BW80. Under a second approach of the proposed scheme, the subcarrier indices of a dMRU may be generated from corresponding dRU subcarrier indices from the table of design 2400 shown in FIG. 24.

The same methods of generation of dMRU subcarrier indices may be applied to dMRUs for BW20, BW40 and BW80. For instance, dMRU78_1 may be built from a 52-tone dRU2 and a 26-tone dRU2. Similarly, dMRU132_2 may be built from a 26-tone dRU5 and a 106-tone dRU2.

Illustrative Implementations

FIG. 25 illustrates an example system 2500 having at least an example apparatus 2510 and an example apparatus 2520 in accordance with an implementation of the present disclosure. Each of apparatus 2510 and apparatus 2520 may perform various functions to implement schemes, techniques, processes and methods described herein pertaining to optimization of distributed RU tone plans for PAPR reduction in 6 GHz LPI systems, including the various schemes described above with respect to various proposed designs, concepts, schemes, systems and methods described above as well as processes described below. For instance, apparatus 2510 may be an example implementation of communication entity 110, and apparatus 2520 may be an example implementation of communication entity 120.

Each of apparatus 2510 and apparatus 2520 may be a part of an electronic apparatus, which may be a STA or an AP, such as a portable or mobile apparatus, a wearable apparatus, a wireless communication apparatus or a computing apparatus. For instance, each of apparatus 2510 and apparatus 2520 may be implemented in a smartphone, a smart watch, a personal digital assistant, a digital camera, or a computing equipment such as a tablet computer, a laptop computer or a notebook computer. Each of apparatus 2510 and apparatus 2520 may also be a part of a machine type apparatus, which may be an IoT apparatus such as an immobile or a stationary apparatus, a home apparatus, a wire communication apparatus or a computing apparatus. For instance, each of apparatus 2510 and apparatus 2520 may be implemented in a smart thermostat, a smart fridge, a smart door lock, a wireless speaker or a home control center. When implemented in or as a network apparatus, apparatus 2510 and/or apparatus 2520 may be implemented in a network node, such as an AP in a WLAN.

In some implementations, each of apparatus 2510 and apparatus 2520 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 2510 and apparatus 2520 may be implemented in or as a STA or an AP. Each of apparatus 2510 and apparatus 2520 may include at least some of those components shown in FIG. 25 such as a processor 2512 and a processor 2522, respectively, for example. Each of apparatus 2510 and apparatus 2520 may further include one or more other components not pertinent to the proposed scheme of the present disclosure (e.g., internal power supply, display device and/or user interface device), and, thus, such component(s) of apparatus 2510 and apparatus 2520 are neither shown in FIG. 25 nor described below in the interest of simplicity and brevity.

In one aspect, each of processor 2512 and processor 2522 may be implemented in the form of one or more single-core processors, one or more multi-core processors, one or more RISC processors or one or more CISC processors. That is, even though a singular term "a processor" is used herein to refer to processor 2512 and processor 2522, each of processor 2512 and processor 2522 may include multiple processors in some implementations and a single processor in other implementations in accordance with the present disclosure. In another aspect, each of processor 2512 and processor 2522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 2512 and processor 2522 is a special-purpose machine specifically designed, arranged and configured to perform specific tasks including those pertaining to optimization of distributed RU tone plans for PAPR reduction in 6 GHz LPI systems in accordance with various implementations of the present disclosure. For instance, each of processor 2512 and processor 2522 may be configured with hardware components, or circuitry, implementing one, some or all of the examples described and illustrated herein.

In some implementations, apparatus 2510 may also include a transceiver 2516 coupled to processor 2512. Transceiver 2516 may be capable of wirelessly transmitting and receiving data. In some implementations, apparatus 2520 may also include a transceiver 2526 coupled to processor 2522. Transceiver 2526 may include a transceiver capable of wirelessly transmitting and receiving data.

In some implementations, apparatus 2510 may further include a memory 2514 coupled to processor 2512 and capable of being accessed by processor 2512 and storing data therein. In some implementations, apparatus 2520 may further include a memory 2524 coupled to processor 2522 and capable of being accessed by processor 2522 and storing data therein. Each of memory 2514 and memory 2524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 2514 and memory 2524 may include a type of read-only memory (ROM) such as mask ROM, programmable ROM (PROM), erasable programmable ROM (EPROM) and/or electrically erasable programmable ROM (EEPROM). Alternatively, or additionally, each of memory 2514 and memory 2524 may include a type of non-volatile random-access memory (NVRAM) such as flash memory, solid-state memory, ferroelectric RAM (FeRAM), magnetoresistive RAM (MRAM) and/or phase-change memory.

Each of apparatus 2510 and apparatus 2520 may be a communication entity capable of communicating with each other using various proposed schemes in accordance with the present disclosure. For illustrative purposes and without limitation, a description of capabilities of apparatus 2510, as communication entity 110, and apparatus 2520, as communication entity 120, is provided below. It is noteworthy that, although the example implementations described below are provided in the context of WLAN, the same may be implemented in other types of networks. Thus, although the following description of example implementations pertains to a scenario in which apparatus 2510 functions as a transmitting device and apparatus 2520 functions as a receiving device, the same is also applicable to another scenario in which apparatus 2510 functions as a receiving device and apparatus 2520 functions as a transmitting device.

Under a proposed scheme in accordance with the present disclosure with respect to optimization of distributed RU tone plans for PAPR reduction in 6 GHz LPI systems, processor 2512 of apparatus 2510 may distribute a plurality of subcarriers of a RU over a bandwidth to generate a dRU or a dMRU. In distributing the plurality of subcarriers of the RU to generate the dRU or the dMRU, processor 2512 may distribute the plurality of subcarriers of the RU with a predefined span over each 20 MHz frequency segment or subblock in the bandwidth and with a gap of at least a minimum size around a center DC tone in a distribution pattern of the plurality of subcarriers to result in reduction in a PAPR in communicating with the communication entity. Moreover, processor 2512 may communicate, via transceiver 2516, with a communication entity using the dRU or the dMRU.

In some implementations, the predefined span over each 20 MHz frequency segment or subblock in the bandwidth may include a span over 241 tones with a tone distribution range of [−120:−2, 2:120]. In such cases, the gap may include at least three DC tones around a center DC tone in the tone distribution range. Alternatively, the predefined span over each 20 MHz frequency segment or subblock in the bandwidth may include a span over 243 tones with a tone distribution range of [−121:−3, 3:121]. In such cases, the gap may include at least five DC tones around a center DC tone in the tone distribution range.

In some implementations, the gap may be multiple times of a dRU tone separation distance ($D_{td}$). In such cases, for each 20 MHz frequency segment or subblock in the bandwidth, the gap may be expressed as $n*D_{td}$, n=1, 2, 3 or 4.

In some implementations, the plurality of subcarriers of the RU may be distributed to generate a 26-tone, 52-tone or 106-tone dRU over a 20 MHz bandwidth. In such cases, data and pilot subcarrier indices of the 26-tone dRU over the 20 MHz bandwidth may include [−120:9:−12, 6:9:114] for a 26-tone dRU1, [−116:9:−8, 10:9:118] for a 26-tone dRU2, [−118:9:−10, 8:9:116] for a 26-tone dRU3, [−114:9:−6, 12:9:120] for a 26-tone dRU4, [−112:9:−4, 5:9:113] for a 26-tone dRU5, [−119:9:−11, 7:9:115] for a 26-tone dRU6, [−115:9:−7, 11:9:119] for a 26-tone dRU7, [−117:9:−9, 9:9:117] for a 26-tone dRU8 and [−113:9:−5, 4:9:112] for a 26-tone dRU9. Additionally, data and pilot subcarrier indices of the 52-tone dRU over the 20 MHz bandwidth may include 26-tone [dRU1, dRU2] for a 52-tone dRU1, 26-tone [dRU3, dRU4] for a 52-tone dRU2, 26-tone [dRU6, dRU7] for a 52-tone dRU3 and 26-tone [dRU8, dRU9] for a 52-tone dRU4. Moreover, data and pilot subcarrier indices of the 106-tone dRU over the 20 MHz bandwidth may include 26-tone [dRU1 dRU4], [−3, 3] for a 106-tone dRU1 and 26-tone [dRU6 dRU9], [−2, 2] for a 106-tone dRU2.

In some implementations, the plurality of subcarriers of the RU may be distributed to generate a 26-tone, 52-tone or 106-tone dRU over a 20 MHz bandwidth. In such cases, data and pilot subcarrier indices of the 26-tone dRU over the 20 MHz bandwidth may include [−121:9:−13, 5:9:113] for a 26-tone dRU1, [−117:9:−9, 9:9:117] for a 26-tone dRU2, [−119:9:−11, 7:9:115] for a 26-tone dRU3, [−115:9:−7, 11:9:119] for a 26-tone dRU4, [−113:9:−5, 13:9:121] for a 26-tone dRU5, [−120:9:−12, 6:9:114] for a 26-tone dRU6, [−116:9:−8, 10:9:118] for a 26-tone dRU7, [−118:9:−10, 8:9:116] for a 26-tone dRU8 and [−114:9:−6, 12:9:120] for a 26-tone dRU9. Additionally, data and pilot subcarrier indices of the 52-tone dRU over the 20 MHz bandwidth may include 26-tone [dRU1, dRU2] for a 52-tone dRU1, 26-tone [dRU3, dRU4] for a 52-tone dRU2, 26-tone [dRU6, dRU7] for a 52-tone dRU3 and 26-tone [dRU8, dRU9] for a 52-tone dRU4. Moreover, data and pilot subcarrier indices of the 106-tone dRU over the 20 MHz bandwidth may include 26-tone [dRU1 dRU4], [−4, 3] for a 106-tone dRU1 and 26-tone [dRU6 dRU9], [−3, 4] for a 106-tone dRU2.

In some implementations, the plurality of subcarriers of the RU may be distributed to generate a 26-tone, 52-tone, 106-tone or 242-tone dRU over a 40 MHz bandwidth. In such cases, data and pilot subcarrier indices of the 26-tone dRU over the 40 MHz bandwidth may include [−242:18:−26, 10:18:226] for a 26-tone dRU1, [−233:18:−17, 19:18:235] for a 26-tone dRU2, [−238:18:−22, 14:18:230] for a d26-tone RU3, [−229:18:−13, 23:18:239] for a 26-tone dRU4, [−225:18:−9, 27:18:243] for a 26-tone dRU5, [−240:18:−24, 12:18:228] for a 26-tone dRU6, [−231:18:−15, 21:18:237] for a 26-tone dRU7, [−236:18:−20, 16:18:232] for a 26-tone dRU8, [−227:18:−11, 25:18:241] for a 26-tone dRU9, [−241:18:−25, 11:18:227] for a 26-tone dRU10, [−232:18:−16, 20:18:236] for a 26-tone dRU11, [−237:18:−21, 15:18:231] for a 26-tone dRU12, [−228:18:−12, 24:18:240] for a 26-tone dRU13, [−234:18:−18, 18:18:234] for a 26-tone dRU14, [−239:18:−23, 13:18:229] for a 26-tone dRU15, [−230:18:−14, 22:18:238] for a 26-tone dRU16, [−235:18:−19, 17:18:233] for a 26-tone dRU17 and [−226:18:−10, 26:18:242] for a 26-tone dRU18, wherein data and pilot subcarrier indices of the 52-tone dRU over the 40 MHz bandwidth comprise [−242:9:−17, 10:9:235] for a 52-tone dRU1, [−238:9:−13, 14:9:239] for a 52-tone dRU2, [−240:9:−15, 12:9:237] for a 52-tone dRU3, [−236:9:−11, 16:9:241] for a 52-tone dRU4, [−241:9:−16, 11:9:236] for a 52-tone dRU5, [−237:9:−12, 15:9:240] for a 52-tone dRU6, [−239:9:−14, 13:9:238] for a 52-tone dRU7 and [−235:9:−10, 17:9:242] for a 52-tone dRU8, wherein data and pilot subcarrier indices of the 106-tone dRU over the 40 MHz bandwidth comprise 26-tone [dRU1-dRU4], [−8, 5] for a 106-tone dRU1, 26-tone [dRU6 dRU9], [−6, 7] for a 106-tone dRU2, 26-tone [dRU10 dRU13], [−7, 6] for a 106-tone dRU3 and 26-tone [dRU15-dRU18], [−5, 8] for a 106-tone dRU4, and wherein data and pilot subcarrier indices of the 242-tone dRU over the 40 MHz bandwidth comprise 106-tone [dRU1 dRU2], 26-tone dRU5 and [−244, −4, 3, 9] for a 242-tone dRU1 and 106-tone [dRU3 dRU4], 26-tone dRU14 and [−243, −3, 4, 244] for a 242-tone dRU2.

In some implementations, the plurality of subcarriers of the RU may be distributed to generate a 52-tone, 106-tone, 242-tone or 484-tone dRU over an 80 MHz bandwidth. In such cases, data and pilot subcarrier indices of the 52-tone dRU over the 80 MHz bandwidth may include [−483:36:−51, 17:36:449], [−467:36:−35, 33:36:465] for a 52-tone dRU1, [−475:36:−43, 25:36:457], [−459:36:−27, 41:36:473] for a 52-tone dRU2, [−479:36:−47, 21:36:453], [−463:36:−31, 37:36:469] for a 52-tone dRU3, [−471:36:−39, 29:36:461], [−455:36:−23, 45:36:477] for a 52-tone dRU4, [−477:36:−45, 23:36:455], [−461:36:−29, 39:36:471] for a 52-tone dRU5, [−469:36:−37, 31:36:463], [−453:36:−21, 47:36:479] for a 52-tone dRU6, [−481:36:−49, 19:36:451], [−465:36:−33, 35:36:467] for a 52-tone dRU7, [−473:36:−41, 27:36:459], [−457:36:−25, 43:36:475] for a 52-tone dRU8, [−482:36:−50, 18:36:450], [−466:36:−34, 34:36:466] for a 52-tone dRU9, [−474:36:−42, 26:36:458], [−458:36:−26, 42:36:474] for a 52-tone dRU10, [−478:36:−46, 22:36:454], [−462:36:−30, 38:36:470] for a 52-tone dRU11, [−470:36:−38, 30:36:462], [−454:36:−22, 46:36:478] for a 52-tone dRU12, [−476:36:−44, 24:36:456], [−460:36:−28, 40:36:472] for a 52-tone dRU13, [−468:36:−36, 32:36:464], [−452:36:−20, 48:36:480] for a 52-tone dRU14, [−480:36:−48, 20:36:452], [−464:36:−32, 36:36:468] for a 52-tone dRU15 and [−472:36:−40, 28:36:460], [−456:36:−24, 44:36:476] for a 52-tone dRU16. Additionally, data and pilot subcarrier indices of the 106-tone dRU over the 80 MHz bandwidth may include 52-tone [dRU1 dRU2], [−495, 485] for a 106-tone dRU1, 52-tone [dRU3 dRU4], [−491, 489] for a 106-tone dRU2, 52-tone [dRU5 dRU6], [−489, 491] for a 106-tone dRU3, 52-tone [dRU7 dRU8], [−493, 487] for a 106-tone dRU4, 52-tone [dRU9 dRU10], [−494, 486] for a 106-tone dRU5, 52-tone [dRU11 dRU12], [−490, 490] for a 106-tone dRU6, 52-tone [dRU13 dRU14], [−488, 492] for a 106-tone dRU7 and 52-tone [dRU15 dRU16], [−492, 488] for a 106-tone dRU8. Moreover, data and pilot subcarrier indices of the 242-tone dRU over the 80 MHz bandwidth may include [−499:4:−19, 17:4:497] for a 242-tone dRU1, [−497:4:−17, 19:4:499] for a 242-tone dRU2, [−498:4:−18, 18:4:498] for a 242-tone dRU3 and [−496:4:−16, 20:4:500] for a 242-tone dRU4. Furthermore, data and pilot subcarrier indices of the 484-tone dRU over the 80 MHz bandwidth may include [−499:2:−17, 17:2:499] for a 484-tone dRU1 and [−498:2:−16, 18:2:500] for a 484-tone dRU2.

In some implementations, in distributing the plurality of subcarriers of the RU over the bandwidth to generate the dRU or the dMRU, processor 2512 may generate the dMRU by combining a first dRU of a first size and a second dRU of a second size different from the first size. In some implementations, the dMRU may include: (i) a 78-tone dMRU built from one of the following: (a) one of three combinations of one 26-tone dRU and one 52-tone dRU on each 20 MHz frequency segment or subblock in an 80 MHz, 160 MHz or 320 MHz bandwidth; (b) one of six combinations of one 26-tone dRU and one 52-tone dRU on each 40 MHz frequency segment or subblock in the 80 MHz, 160 MHz or 320 MHz bandwidth; (c) one of eight combinations of one 26-tone dRU and one 52-tone dRU on each 80 MHz frequency subblock in the 80 MHz, 160 MHz or 320 MHz bandwidth; or (ii) a 132-tone dMRU built from one of the following: (a) one of two combinations of one 26-tone dRU and one 106-tone dRU on each 20 MHz frequency segment or subblock in an 80 MHz, 160 MHz or 320 MHz bandwidth; (b) one of four combinations of one 26-tone dRU and one 106-tone dRU on each 40 MHz frequency segment or subblock in the 80 MHz, 160 MHz or 320 MHz bandwidth; or (c) one of four combinations of one 26-tone dRU and one 106-tone dRU on each 80 MHz frequency subblock in the 80 MHz, 160 MHz or 320 MHz bandwidth. In some implementations, the dMRU may be generated from corresponding dRU subcarrier indices from a table of a plurality of dRU of different sizes (e.g., any of the tables shown in the various figures of the present disclosure).

Illustrative Processes

FIG. 26 illustrates an example process 2600 in accordance with an implementation of the present disclosure. Process 2600 may represent an aspect of implementing various proposed designs, concepts, schemes, systems and methods described above. More specifically, process 2600 may represent an aspect of the proposed concepts and schemes pertaining to optimization of distributed RU tone plans for PAPR reduction in 6 GHz LPI systems in accordance with the present disclosure. Process 2600 may include one or more operations, actions, or functions as illustrated by one or more of blocks 2610 and 2620. Although illustrated as discrete blocks, various blocks of process 2600 may be divided into additional blocks, combined into fewer blocks, or eliminated, depending on the desired implementation. Moreover, the blocks/sub-blocks of process 2600 may be executed in the order shown in FIG. 26 or, alternatively in a different order. Furthermore, one or more of the blocks/sub-blocks of process 2600 may be executed repeatedly or iteratively. Process 2600 may be implemented by or in apparatus 2510 and apparatus 2520 as well as any variations thereof. Solely for illustrative purposes and without limiting the scope, process 2600 is described below in the context of apparatus 2510 as communication entity 110 (e.g., a transmitting device whether a STA or an AP) and apparatus 2520 as communication entity 120 (e.g., a receiving device whether a STA or an AP) of a wireless network such as a WLAN in accordance with one or more of IEEE 802.11 standards. Process 2600 may begin at block 2610.

At 2610, process 2600 may involve processor 2512 of apparatus 2510 distributing a plurality of subcarriers of a RU over a bandwidth to generate a dRU or a dMRU. In distributing the plurality of subcarriers of the RU to generate the dRU or the dMRU, process 2600 may involve processor 2512 distributing the plurality of subcarriers of the RU with a predefined span over each 20 MHz frequency segment or subblock in the bandwidth and with a gap of at least a minimum size around a center DC tone in a distribution pattern of the plurality of subcarriers to result in reduction in a PAPR in communicating with the communication entity. Process 2600 may proceed from 2610 to 2620.

At 2620, process 2600 may involve processor 2512 communicating, via transceiver 2516, with a communication entity using the dRU or the dMRU.

In some implementations, the predefined span over each 20 MHz frequency segment or subblock in the bandwidth may include a span over 241 tones with a tone distribution range of [−120:−2, 2:120]. In such cases, the gap may include at least three DC tones around a center DC tone in the tone distribution range. Alternatively, the predefined span over each 20 MHz frequency segment or subblock in the bandwidth may include a span over 243 tones with a tone distribution range of [−121:−3, 3:121]. In such cases, the gap may include at least five DC tones around a center DC tone in the tone distribution range.

In some implementations, the gap may be multiple times of a dRU tone separation distance ($D_{td}$). In such cases, for each 20 MHz frequency segment or subblock in the bandwidth, the gap may be expressed as $n*D_{td}$, n=1, 2, 3 or 4.

In some implementations, the plurality of subcarriers of the RU may be distributed to generate a 26-tone, 52-tone or 106-tone dRU over a 20 MHz bandwidth. In such cases, data and pilot subcarrier indices of the 26-tone dRU over the 20 MHz bandwidth may include [−120:9:−12, 6:9:114] for a 26-tone dRU1, [−116:9:−8, 10:9:118] for a 26-tone dRU2, [−118:9:−10, 8:9:116] for a 26-tone dRU3, [−114:9:−6, 12:9:120] for a 26-tone dRU4, [−1_12:9:−4, 5:9:113] for a 26-tone dRU5, [−119:9:−11, 7:9:115] for a 26-tone dRU6, [−115:9:−7, 11:9:119] for a 26-tone dRU7, [−117:9:−9, 9:9:117] for a 26-tone dRU8 and [−113:9:−5, 4:9:112] for a 26-tone dRU9. Additionally, data and pilot subcarrier indices of the 52-tone dRU over the 20 MHz bandwidth may include 26-tone [dRU1, dRU2] for a 52-tone dRU1, 26-tone [dRU3, dRU4] for a 52-tone dRU2, 26-tone [dRU6, dRU7] for a 52-tone dRU3 and 26-tone [dRU8, dRU9] for a 52-tone dRU4. Moreover, data and pilot subcarrier indices of the 106-tone dRU over the 20 MHz bandwidth may include 26-tone [dRU1~dRU4], [−3, 3] for a 106-tone dRU1 and 26-tone [dRU6 dRU9], [−2, 2] for a 106-tone dRU2.

In some implementations, the plurality of subcarriers of the RU may be distributed to generate a 26-tone, 52-tone or 106-tone dRU over a 20 MHz bandwidth. In such cases, data and pilot subcarrier indices of the 26-tone dRU over the 20 MHz bandwidth may include [−121:9:−13, 5:9:113] for a 26-tone dRU1, [−117:9:−9, 9:9:117] for a 26-tone dRU2, [−119:9:−11, 7:9:115] for a 26-tone dRU3, [−115:9:−7, 11:9:119] for a 26-tone dRU4, [−113:9:−5, 13:9:121] for a 26-tone dRU5, [−120:9:−12, 6:9:114] for a 26-tone dRU6, [−116:9:−8, 10:9:118] for a 26-tone dRU7, [−118:9:−10, 8:9:116] for a 26-tone dRU8 and [−114:9:−6, 12:9:120] for a 26-tone dRU9. Additionally, data and pilot subcarrier indices of the 52-tone dRU over the 20 MHz bandwidth may include 26-tone [dRU1, dRU2] for a 52-tone dRU1, 26-tone [dRU3, dRU4] for a 52-tone dRU2, 26-tone [dRU6, dRU7] for a 52-tone dRU3 and 26-tone [dRU8, dRU9] for a 52-tone dRU4. Moreover, data and pilot subcarrier indices of the 106-tone dRU over the 20 MHz bandwidth may include 26-tone [dRU1 dRU4], [−4, 3] for a 106-tone dRU1 and 26-tone [dRU6 dRU9], [−3, 4] for a 106-tone dRU2.

In some implementations, the plurality of subcarriers of the RU may be distributed to generate a 26-tone, 52-tone, 106-tone or 242-tone dRU over a 40 MHz bandwidth. In such cases, data and pilot subcarrier indices of the 26-tone dRU over the 40 MHz bandwidth may include [−242:18:−26, 10:18:226] for a 26-tone dRU1, [−233:18:−17, 19:18:235] for a 26-tone dRU2, [−238:18:−22, 14:18:230] for a d26-tone RU3, [−229:18:−13, 23:18:239] for a 26-tone dRU4, [−225:18:−9, 27:18:243] for a 26-tone dRU5, [−240:18:−24, 12:18:228] for a 26-tone dRU6, [−231:18:−15, 21:18:237] for a 26-tone dRU7, [−236:18:−20, 16:18:232] for a 26-tone dRU8, [−227:18:−11, 25:18:241] for a 26-tone dRU9, [−241:18:−25, 11:18:227] for a 26-tone dRU10, [−232:18:−16, 20:18:236] for a 26-tone dRU11, [−237:18:−21, 15:18:231] for a 26-tone dRU12, [−228:18:−12, 24:18:240] for a 26-tone dRU13, [−234:18:−18, 18:18:234] for a 26-tone dRU14, [−239:18:−23, 13:18:229] for a 26-tone dRU15, [−230:18:−14, 22:18:238] for a 26-tone dRU16, [−235:18:−19, 17:18:233] for a 26-tone dRU17 and [−226:18:−10, 26:18:242] for a 26-tone dRU18, wherein data and pilot subcarrier indices of the 52-tone dRU over the 40 MHz bandwidth comprise [−242:9:−17, 10:9:235] for a 52-tone dRU1, [−238:9:−13, 14:9:239] for a 52-tone dRU2, [−240:9:−15, 12:9:237] for a 52-tone dRU3, [−236:9:−11, 16:9:241] for a 52-tone dRU4, [−241:9:−16, 11:9:236] for a 52-tone dRU5, [−237:9:−12, 15:9:240] for a 52-tone dRU6, [−239:9:−14, 13:9:238] for a 52-tone dRU7 and [−235:9:−10, 17:9:242] for a 52-tone dRU8, wherein data and pilot subcarrier indices of the 106-tone dRU over the 40 MHz bandwidth comprise 26-tone [dRU1-dRU4], [−8, 5] for a 106-tone dRU1, 26-tone [dRU6 dRU9], [−6, 7] for a 106-tone dRU2, 26-tone [dRU10 dRU13], [−7, 6] for a 106-tone dRU3 and 26-tone [dRU15-dRU18], [−5, 8] for a 106-tone dRU4, and wherein data and pilot subcarrier indices of the 242-tone dRU over the 40 MHz bandwidth comprise 106-tone [dRU1 dRU2], 26-tone dRU5 and [−244, −4, 3, 9] for a 242-tone dRU1 and 106-tone [dRU3 dRU4], 26-tone dRU14 and [−243, −3, 4, 244] for a 242-tone dRU2.

In some implementations, the plurality of subcarriers of the RU may be distributed to generate a 52-tone, 106-tone, 242-tone or 484-tone dRU over an 80 MHz bandwidth. In such cases, data and pilot subcarrier indices of the 52-tone dRU over the 80 MHz bandwidth may include [−483:36:−51, 17:36:449], [−467:36:−35, 33:36:465] for a 52-tone dRU1, [−475:36:−43, 25:36:457], [−459:36:−27, 41:36:473] for a 52-tone dRU2, [−479:36:−47, 21:36:453], [−463:36:−31, 37:36:469] for a 52-tone dRU3, [−471:36:−39, 29:36:461], [−455:36:−23, 45:36:477] for a 52-tone dRU4, [−477:36:−45, 23:36:455], [−461:36:−29, 39:36:471] for a 52-tone dRU5, [−469:36:−37, 31:36:463], [−453:36:−21, 47:36:479] for a 52-tone dRU6, [−481:36:−49, 19:36:451], [−465:36:−33, 35:36:467] for a 52-tone dRU7, [−473:36:−41, 27:36:459], [−457:36:−25, 43:36:475] for a 52-tone dRU8, [−482:36:−50, 18:36:450], [−466:36:−34, 34:36:466] for a 52-tone dRU9, [−474:36:−42, 26:36:458], [−458:36:−26, 42:36:474] for a 52-tone dRU10, [−478:36:−46, 22:36:454], [−462:36:−30, 38:36:470] for a 52-tone dRU11, [−470:36:−38, 30:36:462], [−454:36:−22, 46:36:478] for a 52-tone dRU12, [−476:36:−44, 24:36:456], [−460:36:−28, 40:36:472] for a 52-tone dRU13, [−468:36:−36, 32:36:464], [−452:36:−20, 48:36:480] for a 52-tone dRU14, [−480:36:−48, 20:36:452], [−464:36:−32, 36:36:468] for a 52-tone dRU15 and [−472:36:−40, 28:36:460], [−456:36:−24, 44:36:476] for a 52-tone dRU16. Additionally, data and pilot subcarrier indices of the 106-tone dRU over the 80 MHz bandwidth may include 52-tone [dRU1 dRU2], [−495, 485] for a 106-tone dRU1, 52-tone [dRU3 dRU4], [−491, 489] for a 106-tone dRU2, 52-tone [dRU5 dRU6], [−489, 491] for a 106-tone dRU3, 52-tone [dRU7 dRU8], [−493, 487] for a 106-tone dRU4, 52-tone [dRU9 dRU10], [−494, 486] for a 106-tone dRU5, 52-tone [dRU11 dRU12], [−490, 490] for a 106-tone dRU6, 52-tone [dRU13 dRU14], [−488, 492] for a 106-tone dRU7 and 52-tone [dRU15 dRU16], [−492, 488] for a 106-tone dRU8. Moreover, data and pilot subcarrier indices of the 242-tone dRU over the 80 MHz bandwidth may include [−499:4:−19, 17:4:497] for a 242-tone dRU1, [−497:4:−17, 19:4:499] for a 242-tone dRU2, [−498:4:−18, 18:4:498] for a 242-tone dRU3 and [−496:4:−16, 20:4:500] for a 242-tone dRU4. Furthermore, data and pilot subcarrier indices of the 484-tone dRU over the 80 MHz bandwidth may include [−499:2:−17, 17:2:499] for a 484-tone dRU1 and [−498:2:−16, 18:2:500] for a 484-tone dRU2.

In some implementations, in distributing the plurality of subcarriers of the RU over the bandwidth to generate the dRU or the dMRU, process 2600 may involve processor 2512 generating the dMRU by combining a first dRU of a first size and a second dRU of a second size different from the first size. In some implementations, the dMRU may include: (i) a 78-tone dMRU built from one of the following: (a) one of three combinations of one 26-tone dRU and one 52-tone dRU on each 20 MHz frequency segment or subblock in an 80 MHz, 160 MHz or 320 MHz bandwidth; (b) one of six combinations of one 26-tone dRU and one 52-tone dRU on each 40 MHz frequency segment or subblock in the 80 MHz, 160 MHz or 320 MHz bandwidth; (c) one of eight combinations of one 26-tone dRU and one 52-tone dRU on each 80 MHz frequency subblock in the 80 MHz, 160 MHz or 320 MHz bandwidth; or (ii) a 132-tone dMRU built from one of the following: (a) one of two combinations of one 26-tone dRU and one 106-tone dRU on each 20 MHz frequency segment or subblock in an 80 MHz, 160 MHz or 320 MHz bandwidth; (b) one of four combinations of one 26-tone dRU and one 106-tone dRU on each 40 MHz frequency segment or subblock in the 80 MHz, 160 MHz or 320 MHz bandwidth; or (c) one of four combinations of one 26-tone dRU and one 106-tone dRU on each 80 MHz frequency subblock in the 80 MHz, 160 MHz or 320 MHz bandwidth. In some implementations, the dMRU may be generated from corresponding dRU subcarrier indices from a table of a plurality of dRU of different sizes (e.g., any of the tables shown in the various figures of the present disclosure).

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    distributing a plurality of subcarriers of a resource unit (RU) over a bandwidth to generate a distributed-tone RU(dRU) or a distributed-tone multi-RU(dMRU); and
    communicating with a communication entity using the dRU or the dMRU,
    wherein the distributing of the plurality of subcarriers of the RU to generate the dRU or the dMRU comprises distributing the plurality of subcarriers of the RU with a predefined span over each 20 MHz frequency segment or subblock in the bandwidth and with a gap of at least a minimum size around a center direct-current (DC) tone in a distribution pattern of the plurality of subcarriers to result in reduction in a peak-to-average power ratio (PAPR) in communicating with the communication entity.

2. The method of claim 1, wherein the predefined span over each 20 MHz frequency segment or subblock comprises a span over 241 tones with a tone distribution range of [−120:−2, 2:120], and wherein the gap comprises at least three DC tones around a center DC tone in the tone distribution range.

3. The method of claim 1, wherein the predefined span over each 20 MHz frequency segment or subblock comprises a span over 243 tones with a tone distribution range of [−121:−3, 3:121], and wherein the gap comprises at least five DC tones around a center DC tone in the tone distribution range.

4. The method of claim 1, wherein the gap is multiple times of a dRU tone separation distance ($D_{td}$), and wherein, for each 20 MHz frequency segment or subblock in the bandwidth, the gap is expressed as $n*D_{td}$, n=1, 2, 3 or 4.

5. The method of claim 1, wherein the plurality of subcarriers of the RU are distributed to generate a 26-tone, 52-tone or 106-tone dRU over a 20 MHz bandwidth, wherein data and pilot subcarrier indices of the 26-tone dRU over the 20 MHz bandwidth comprise [−120:9:−12, 6:9:114] for a 26-tone dRU1, [−116:9:−8, 10:9:118] for a 26-tone dRU2, [−118:9:−10, 8:9:116] for a 26-tone dRU3, [−114:9:−6, 12:9:120] for a 26-tone dRU4, [−112:9:−4, 5:9:113] for a 26-tone dRU5, [−119:9:−11, 7:9:115] for a 26-tone dRU6, [−115:9:−7, 11:9:119] for a 26-tone dRU7, [−1_17:9:−9, 9:9:117] for a 26-tone dRU8 and [−113:9:−5, 4:9:112] for a 26-tone dRU9, wherein data and pilot subcarrier indices of the 52-tone dRU over the 20 MHz bandwidth comprise 26-tone [dRU1, dRU2] for a 52-tone dRU1, 26-tone [dRU3, dRU4] for a 52-tone dRU2, 26-tone [dRU6, dRU7] for a 52-tone dRU3 and 26-tone [dRU8, dRU9] for a 52-tone dRU4, and wherein data and pilot subcarrier indices of the 106-tone dRU over the 20 MHz bandwidth comprise 26-tone [dRU1 dRU4], [−3, 3] for a 106-tone dRU1 and 26-tone [dRU6-dRU9], [−2, 2] for a 106-tone dRU2.

6. The method of claim 1, wherein the plurality of subcarriers of the RU are distributed to generate a 26-tone, 52-tone or 106-tone dRU over a 20 MHz bandwidth, wherein data and pilot subcarrier indices of the 26-tone dRU over the 20 MHz bandwidth comprise [−121:9:−13, 5:9:113] for a 26-tone dRU1, [−117:9:−9, 9:9:117] for a 26-tone dRU2, [−119:9:−11, 7:9:115] for a 26-tone dRU3, [−115:9:−7, 11:9:119] for a 26-tone dRU4, [−113:9:−5, 13:9:121] for a 26-tone dRU5, [−120:9:−12, 6:9:114] for a 26-tone dRU6, [−116:9:−8, 10:9:118] for a 26-tone dRU7, [−118:9:−10, 8:9:116] for a 26-tone dRU8 and [−114:9:−6, 12:9:120] for a 26-tone dRU9, wherein data and pilot subcarrier indices of the 52-tone dRU over the 20 MHz bandwidth comprise 26-tone [dRU1, dRU2] for a 52-tone dRU1, 26-tone [dRU3, dRU4] for a 52-tone dRU2, 26-tone [dRU6, dRU7] for a 52-tone dRU3 and 26-tone [dRU8, dRU9] for a 52-tone dRU4, and wherein data and pilot subcarrier indices of the 106-tone dRU over the 20 MHz bandwidth comprise 26-tone [dRU1 dRU4], [−4, 3] for a 106-tone dRU1 and 26-tone [dRU6 dRU9], [−3, 4] for a 106-tone dRU2.

7. The method of claim 1, wherein the plurality of subcarriers of the RU are distributed to generate a 26-tone, 52-tone, 106-tone or 242-tone dRU over a 40 MHz bandwidth, wherein data and pilot subcarrier indices of the 26-tone dRU over the 40 MHz bandwidth comprise [−242:18:−26, 10:18:226] for a 26-tone dRU1, [−233:18:−17, 19:18:235] for a 26-tone dRU2, [−238:18:−22, 14:18:230] for a d26-tone RU3, [−229:18:−13, 23:18:239] for a 26-tone dRU4, [−225:18:−9, 27:18:243] for a 26-tone dRU5, [−240:18:−24, 12:18:228] for a 26-tone dRU6, [−231:18:−15, 21:18:237] for a 26-tone dRU7, [−236:18:−20, 16:18:232] for a 26-tone dRU8, [−227:18:−11, 25:18:241] for a 26-tone dRU9, [−241:18:−25, 11:18:227] for a 26-tone dRU10, [−232:18:−16, 20:18:236] for a 26-tone dRU11, [−237:18:−21, 15:18:231] for a 26-tone dRU12, [−228:18:−12, 24:18:240] for a 26-tone dRU13, [−234:18:−18, 18:18:234] for a 26-tone dRU14, [−239:18:−23, 13:18:229] for a 26-tone dRU15, [−230:18:−14, 22:18:238] for a 26-tone dRU16, [−235:18:−19, 17:18:233] for a 26-tone dRU17 and [−226:18:−10, 26:18:242] for a 26-tone dRU18, wherein data and pilot subcarrier indices of the 52-tone dRU over the 40 MHz bandwidth comprise [−242:9:−17, 10:9:235] for a 52-tone dRU1, [−238:9:−13, 14:9:239] for a 52-tone dRU2, [−240:9:−15, 12:9:237] for a 52-tone dRU3, [−236:9:−11, 16:9:241] for a 52-tone dRU4, [−241:9:−16, 11:9:236] for a 52-tone dRU5, [−237:9:−12, 15:9:240] for a 52-tone dRU6, [−239:9:−14, 13:9:238] for a 52-tone dRU7 and [−235:9:−10, 17:9:242] for a 52-tone dRU8, wherein data and pilot subcarrier indices of the 106-tone dRU over the 40 MHz bandwidth comprise 26-tone [dRU1 dRU4], [−8, 5] for a 106-tone dRU1, 26-tone [dRU6 dRU9], [−6, 7] for a 106-tone dRU2, 26-tone [dRU10 dRU13], [−7, 6] for a 106-tone dRU3 and 26-tone [dRU15 dRU18], [−5, 8] for a 106-tone dRU4, and wherein data and pilot subcarrier indices of the 242-tone dRU over the 40 MHz bandwidth comprise 106-tone [dRU1 dRU2], 26-tone dRUS and [−244, −4, 3, 9] for a 242-tone dRU1 and 106-tone [dRU3 dRU4], 26-tone dRU14 and [−243, −3, 4, 244] for a 242-tone dRU2.

8. The method of claim 1, wherein the plurality of subcarriers of the RU are distributed to generate a 52-tone, 106-tone, 242-tone or 484-tone dRU over a 80 MHz bandwidth, wherein data and pilot subcarrier indices of the 52-tone dRU over the 80 MHz bandwidth comprise [−483:36:−51, 17:36:449], [−467:36:−35, 33:36:465] for a 52-tone dRU1, [−475:36:−43, 25:36:457], [−459:36:−27, 41:36:473] for a 52-tone dRU2, [−479:36:−47, 21:36:453], [−463:36:−31, 37:36:469] for a 52-tone dRU3, [−471:36:−39, 29:36:461], [−455:36:−23, 45:36:477] for a 52-tone dRU4, [−477:36:−45, 23:36:455], [−461:36:−29, 39:36:471] for a 52-tone dRUS, [−469:36:−37, 31:36:463], [−453:36:−21, 47:36:479] for a 52-tone dRU6, [−481:36:−49, 19:36:451], [−465:36:−33, 35:36:467] for a 52-tone dRU7, [−473:36:−41, 27:36:459], [−457:36:−25, 43:36:475] for a 52-tone dRU8, [−482:36:−50, 18:36:450], [−466:36:−34, 34:36:466] for a 52-tone dRU9, [−474:36:−42, 26:36:458], [−458:36:−26, 42:36:474] for a 52-tone dRU10, [−478:36:−46, 22:36:454], [−462:36:−30, 38:36:470] for a 52-tone dRU11, [−470:36:−38, 30:36:462], [−454:36:−22, 46:36:478] for a 52-tone dRU12, [−476:36:−44, 24:36:456], [−460:36:−28, 40:36:472] for a 52-tone dRU13, [−468:36:−36, 32:36:464], [−452:36:−20, 48:36:480] for a 52-tone dRU14, [−480:36:−48, 20:36:452], [−464:36:−32, 36:36:468] for a 52-tone dRU15 and [−472:36:−40, 28:36:460], [−456:36:−24, 44:36:476] for a 52-tone dRU16, wherein data and pilot subcarrier indices of the 106-tone dRU over the 80 MHz bandwidth comprise 52-tone [dRU1 dRU2], [−495, 485] for a 106-tone dRU1, 52-tone [dRU3 dRU4], [−491, 489] for a 106-tone dRU2, 52-tone [dRUS dRU6], [−489, 491] for a 106-tone dRU3, 52-tone [dRU7 dRU8], [−493, 487] for a 106-tone dRU4, 52-tone [dRU9-dRU10], [−494, 486] for a 106-tone dRUS, 52-tone [dRU11 dRU12], [−490, 490] for a 106-tone dRU6, 52-tone [dRU13 dRU14], [−488, 492] for a 106-tone dRU7 and 52-tone [dRU15 dRU16], [−492, 488] for a 106-tone dRU8, wherein data and pilot subcarrier indices of the 242-tone dRU over the 80 MHz bandwidth comprise [−499:4:−19, 17:4:497] for a 242-tone dRU1, [−497:4:−17, 19:4:499] for a 242-tone dRU2, [−498:4:−18, 18:4:498] for a 242-tone dRU3 and [−496:4:−16, 20:4:500] for a 242-tone dRU4, and wherein data and pilot subcarrier indices of the 484-tone dRU over the 80 MHz bandwidth comprise [−499:2:−17, 17:2:499] for a 484-tone dRU1 and [−498:2:−16, 18:2:500] for a 484-tone dRU2.

9. The method of claim 1, wherein the distributing of the plurality of subcarriers of the RU over the bandwidth to generate the dRU or the dMRU comprises generating the dMRU by combining a first dRU of a first size and a second dRU of a second size different from the first size.

10. The method of claim 9, wherein the dMRU comprises:
a 78-tone dMRU built from one of:
one of three combinations of one 26-tone dRU and one 52-tone dRU on each 20 MHz frequency segment or subblock in an 80 MHz, 160 MHz or 320 MHz bandwidth; or
one of six combinations of one 26-tone dRU and one 52-tone dRU on each 40 MHz frequency segment or subblock in the 80 MHz, 160 MHz or 320 MHz bandwidth; or one of eight combinations of one 26-tone dRU and one 52-tone dRU on each 80 MHz frequency subblock in the 80 MHz, 160 MHz or 320 MHz bandwidth; or a 132-tone dMRU built from one of:
one of two combinations of one 26-tone dRU and one 106-tone dRU on each 20 MHz frequency segment or subblock in an 80 MHz, 160 MHz or 320 MHz bandwidth; or
one of four combinations of one 26-tone dRU and one 106-tone dRU on each 40 MHz frequency segment or subblock in the 80 MHz, 160 MHz or 320 MHz bandwidth; or
one of four combinations of one 26-tone dRU and one 106-tone dRU on each 80 MHz frequency subblock in the 80 MHz, 160 MHz or 320 MHz bandwidth.

11. The method of claim 9, wherein the dMRU is generated from corresponding dRU subcarrier indices from a table of a plurality of dRU of different sizes.

12. An apparatus, comprising:
a transceiver configured to transmit and receive wirelessly; and
a processor coupled to the transceiver and configured to perform operations comprising:
distributing a plurality of subcarriers of a resource unit (RU) over a bandwidth to generate a distributed-tone RU (dRU) or a distributed-tone multi-RU (dMRU); and
communicating, via the transceiver, with a communication entity using the dRU or the dMRU,
wherein, in distributing the plurality of subcarriers of the RU to generate the dRU or the dMRU, the processor is configured to distribute the plurality of subcarriers of the RU with a predefined span over each 20 MHz frequency segment or subblock in the bandwidth and with a gap of at least a minimum size around a center direct-current (DC) tone in a distribution pattern of the plurality of subcarriers to result in reduction in a peak-to-average power ratio (PAPR) in communicating with the communication entity.

13. The apparatus of claim 12, wherein the predefined span over each 20 MHz frequency segment or subblock comprises a span over 241 tones with a tone distribution range of [−120:−2, 2:120], and wherein the gap comprises at least three DC tones around a center DC tone in the tone distribution range.

14. The apparatus of claim 12, wherein the predefined span over each 20 MHz frequency segment or subblock comprises a span over 243 tones with a tone distribution range of [−121:−3, 3:121], and wherein the gap comprises at least five DC tones around a center DC tone in the tone distribution range.

15. The apparatus of claim 12, wherein the gap is multiple times of a dRU tone separation distance ($D_{td}$), and wherein, for each 20 MHz frequency segment or subblock in the bandwidth, the gap is expressed as n*$D_{td}$, n=1, 2, 3 or 4.

16. The apparatus of claim 12, wherein the plurality of subcarriers of the RU are distributed to generate a 26-tone, 52-tone or 106-tone dRU over a 20 MHz bandwidth, wherein data and pilot subcarrier indices of the 26-tone dRU over the 20 MHz bandwidth comprise [−120:9:−12, 6:9:114] for a 26-tone dRU1, [−116:9:−8, 10:9:118] for a 26-tone dRU2, [−118:9:−10, 8:9:116] for a 26-tone dRU3, [−114:9:−6, 12:9:120] for a 26-tone dRU4, [−112:9:−4, 5:9:113] for a 26-tone dRU5, [−119:9:−11, 7:9:115] for a 26-tone dRU6, [−115:9:−7, 11:9:119] for a 26-tone dRU7, [−117:9:−9, 9:9:117] for a 26-tone dRU8 and [−113:9:−5, 4:9:112] for a 26-tone dRU9, wherein data and pilot subcarrier indices of the 52-tone dRU over the 20 MHz bandwidth comprise 26-tone [dRU1, dRU2] for a 52-tone dRU1, 26-tone [dRU3, dRU4] for a 52-tone dRU2, 26-tone [dRU6, dRU7] for a 52-tone dRU3 and 26-tone [dRU8, dRU9] for a 52-tone dRU4, and wherein data and pilot subcarrier indices of the 106-tone dRU over the 20 MHz bandwidth comprise 26-tone [dRU1 dRU4], [−3, 3] for a 106-tone dRU1 and 26-tone [dRU6 dRU9], [−2, 2] for a 106-tone dRU2.

17. The apparatus of claim 12, wherein the plurality of subcarriers of the RU are distributed to generate a 26-tone, 52-tone or 106-tone dRU over a 20 MHz bandwidth, wherein data and pilot subcarrier indices of the 26-tone dRU over the 20 MHz bandwidth comprise [−121:9:−13, 5:9:113] for a 26-tone dRU1, [−117:9:−9, 9:9:117] for a 26-tone dRU2, [−119:9:−11, 7:9:115] for a 26-tone dRU3, [−115:9:−7, 11:9:119] for a 26-tone dRU4, [−113:9:−5, 13:9:121] for a 26-tone dRU5, [−120:9:−12, 6:9:114] for a 26-tone dRU6, [−116:9:−8, 10:9:118] for a 26-tone dRU7, [−118:9:−10, 8:9:116] for a 26-tone dRU8 and [−114:9:−6, 12:9:120] for a 26-tone dRU9, wherein data and pilot subcarrier indices of the 52-tone dRU over the 20 MHz bandwidth comprise 26-tone [dRU1, dRU2] for a 52-tone dRU1, 26-tone [dRU3, dRU4] for a 52-tone dRU2, 26-tone [dRU6, dRU7] for a 52-tone dRU3 and 26-tone [dRU8, dRU9] for a 52-tone dRU4, and wherein data and pilot subcarrier indices of the 106-tone dRU over the 20 MHz bandwidth comprise 26-tone [dRU1 dRU4], [−4, 3] for a 106-tone dRU1 and 26-tone [dRU6 dRU9], [−3, 4] for a 106-tone dRU2.

18. The apparatus of claim 12, wherein the plurality of subcarriers of the RU are distributed to generate a 26-tone, 52-tone, 106-tone or 242-tone dRU over a 40 MHz bandwidth, wherein data and pilot subcarrier indices of the 26-tone dRU over the 40 MHz bandwidth comprise [−242:18:−26, 10:18:226] for a 26-tone dRU1, [−233:18:−17, 19:18:235] for a 26-tone dRU2, [−238:18:−22, 14:18:230] for a d26-tone RU3, [−229:18:−13, 23:18:239] for a 26-tone dRU4, [−225:18:−9, 27:18:243] for a 26-tone dRU5, [−240:18:−24, 12:18:228] for a 26-tone dRU6, [−231:18:−15, 21:18:237] for a 26-tone dRU7, [−236:18:−20, 16:18:232] for a 26-tone dRU8, [−227:18:−11, 25:18:241] for a 26-tone dRU9, [−241:18:−25, 11:18:227] for a 26-tone dRU10, [−232:18:−16, 20:18:236] for a 26-tone dRU11, [−237:18:−21, 15:18:231] for a 26-tone dRU12, [−228:18:−12, 24:18:240] for a 26-tone dRU13, [−234:18:−18, 18:18:234] for a 26-tone dRU14, [−239:18:−23, 13:18:229] for a 26-tone dRU15, [−230:18:−14, 22:18:238] for a 26-tone dRU16, [−235:18:−19, 17:18:233] for a 26-tone dRU17 and [−226:18:−10, 26:18:242] for a 26-tone dRU18, wherein data and pilot subcarrier indices of the 52-tone dRU over the 40 MHz bandwidth comprise [−242:9:−17, 10:9:235] for a 52-tone dRU1, [−238:9:−13, 14:9:239] for a 52-tone dRU2, [−240:9:−15, 12:9:237] for a 52-tone dRU3, [−236:9:−11, 16:9:241] for a 52-tone dRU4, [−241:9:−16, 11:9:236] for a 52-tone dRU5, [−237:9:−12, 15:9:240] for a 52-tone dRU6, [−239:9:−14, 13:9:238] for a 52-tone dRU7 and [−235:9:−10, 17:9:242] for a 52-tone dRU8, wherein data and pilot subcarrier indices of the 106-tone dRU over the 40 MHz bandwidth comprise 26-tone [dRU1-dRU4], [−8, 5] for a 106-tone dRU1, 26-tone [dRU6 dRU9], [−6, 7] for a 106-tone dRU2, 26-tone [dRU10 dRU13], [−7, 6] for a 106-tone dRU3 and 26-tone [dRU15-dRU18], [−5, 8] for a 106-tone dRU4, and wherein data and pilot subcarrier indices of the 242-tone dRU over the 40 MHz bandwidth comprise 106-tone [dRU1 dRU2], 26-tone dRU5 and [−244, −4, 3, 9] for a 242-tone dRU1 and 106-tone [dRU3 dRU4], 26-tone dRU14 and [−243, −3, 4, 244] for a 242-tone dRU2.

19. The apparatus of claim 12, wherein the plurality of subcarriers of the RU are distributed to generate a 52-tone, 106-tone, 242-tone or 484-tone dRU over a 80 MHz bandwidth, wherein data and pilot subcarrier indices of the 52-tone dRU over the 80 MHz bandwidth comprise [−483:36:−51, 17:36:449], [−467:36:−35, 33:36:465] for a 52-tone dRU1, [−475:36:−43, 25:36:457], [−459:36:−27, 41:36:473] for a 52-tone dRU2, [−479:36:−47, 21:36:453], [−463:36:−31, 37:36:469] for a 52-tone dRU3, [−471:36:−39, 29:36:461], [−455:36:−23, 45:36:477] for a 52-tone dRU4, [−477:36:−45, 23:36:455], [−461:36:−29, 39:36:471] for a 52-tone dRU5, [−469:36:−37, 31:36:463], [−453:36:−21, 47:36:479] for a 52-tone dRU6, [−481:36:−49, 19:36:451], [−465:36:−33, 35:36:467] for a 52-tone dRU7, [−473:36:−41, 27:36:459], [−457:36:−25, 43:36:475] for a 52-tone dRU8, [−482:36:−50, 18:36:450], [−466:36:−34, 34:36:466] for a 52-tone dRU9, [−474:36:−42, 26:36:458], [−458:36:−26, 42:36:474] for a 52-tone dRU10, [−478:36:−46, 22:36:454], [−462:36:−30, 38:36:470] for a 52-tone dRU11, [−470:36:−38, 30:36:462], [−454:36:−22, 46:36:478] for a 52-tone dRU12, [−476:36:−44, 24:36:456], [−460:36:−28, 40:36:472] for a 52-tone dRU13, [−468:36:−36, 32:36:464], [−452:36:−20, 48:36:480] for a 52-tone dRU14, [−480:36:−48, 20:36:452], [−464:36:−32, 36:36:468] for a 52-tone dRU15 and [−472:36:−40, 28:36:460], [−456:36:−24, 44:36:476] for a 52-tone dRU16, wherein data and pilot subcarrier indices of the 106-tone dRU over the 80 MHz bandwidth comprise 52-tone [dRU1 dRU2], [−495, 485] for a 106-tone dRU1, 52-tone [dRU3 dRU4], [−491, 489] for a 106-tone dRU2, 52-tone [dRU5 dRU6], [−489, 491] for a 106-tone dRU3, 52-tone [dRU7 dRU8], [−493, 487] for a 106-tone dRU4, 52-tone [dRU9-dRU10], [−494, 486] for a 106-tone dRU5, 52-tone [dRU11 dRU12], [−490, 490] for a 106-tone dRU6, 52-tone [dRU13 dRU14], [−488, 492] for a 106-tone dRU7 and 52-tone [dRU15 dRU16], [−492, 488] for a 106-tone dRU8, wherein data and pilot subcarrier indices of the 242-tone dRU over the 80 MHz bandwidth comprise [−499:4:−19, 17:4:497] for a 242-tone dRU1, [−497:4:−17, 19:4:499] for a 242-tone dRU2, [−498:4:−18, 18:4:498] for a 242-tone dRU3 and [−496:4:−16, 20:4:500] for a 242-tone dRU4, and wherein data and pilot subcarrier indices of the 484-tone dRU over the 80 MHz bandwidth comprise [−499:2:−17, 17:2:499] for a 484-tone dRU1 and [−498:2:−16, 18:2:500] for a 484-tone dRU2.

20. The apparatus of claim 12, wherein, in distributing the plurality of subcarriers of the RU over the bandwidth to generate the dRU or the dMRU, the processor is configured to generate the dMRU by combining a first dRU of a first size and a second dRU of a second size different from the first size, and wherein the dMRU comprises:

a 78-tone dMRU built from one of:
one of the combinations of one 26-tone dRU and one 52-tone dRU on each 20 MHz frequency segment or subblock in an 80 MHz, 160 MHz or 320 MHz bandwidth; or
one of the combinations of one 26-tone dRU and one 52-tone dRU on each 40 MHz frequency segment or subblock in the 80 MHz, 160 MHz or 320 MHz bandwidth; or
one of the combinations of one 26-tone dRU and one 52-tone dRU on each 80 MHz frequency subblock in the 80 MHz, 160 MHz or 320 MHz bandwidth; or a 132-tone dMRU built from one of:
one of the combinations of one 26-tone dRU and one 106-tone dRU on each 20 MHz frequency segment or subblock in an 80 MHz, 160 MHz or 320 MHz bandwidth; or
one of the combinations of one 26-tone dRU and one 106-tone dRU on each 40 MHz frequency segment or subblock in the 80 MHz, 160 MHz or 320 MHz bandwidth; or
one of the combinations of one 26-tone dRU and one 106-tone dRU on each 80 MHz frequency subblock in the 80 MHz, 160 MHz or 320 MHz bandwidth.

* * * * *